US012687723B2

(12) United States Patent
May

(10) Patent No.: US 12,687,723 B2
(45) Date of Patent: Jul. 21, 2026

(54) HEAD-MOUNTED DISPLAY DEVICE WITH SELECTIVE COLOR SEE-THROUGH VISOR

(71) Applicant: Microsoft Technology Licensing, LLC, Redmond, WA (US)

(72) Inventor: Keenan May, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 18/465,827

(22) Filed: Sep. 12, 2023

(65) Prior Publication Data

US 2025/0085544 A1     Mar. 13, 2025

(51) Int. Cl.
G02B 27/01 (2006.01)
G02B 27/00 (2006.01)
G06T 19/00 (2011.01)

(52) U.S. Cl.
CPC ..... G02B 27/0172 (2013.01); G02B 27/0093 (2013.01); G06T 19/006 (2013.01); G02B 2027/0178 (2013.01)

(58) Field of Classification Search
CPC ............ G02B 27/0172; G02B 27/0093; G02B 2027/0178; G02B 2027/0112; G02B 2027/0118; G06T 19/006
See application file for complete search history.

(56) References Cited

U.S. PATENT DOCUMENTS 11,747,621 B2     9/2023   Vallius
2007/0071385 A1 *  3/2007   Dorrer ............... G02B 6/12019
                                                                        385/14

2021/0199958 A1    7/2021   Huang
2021/0382306 A1   12/2021   Croxford
2022/0128744 A1 *  4/2022   Bohn ................. G02B 27/0172
2023/0011039 A1    1/2023   Sangwoo
2023/0152585 A1    5/2023   Zhang (Continued)

FOREIGN PATENT DOCUMENTS

KR     20230119015 A    8/2023
WO       2022161056 A1  8/2022
WO       2023137123 A1  7/2023

OTHER PUBLICATIONS

"New Electrochromic Material Can Rapidly Change Color Through Electricity", Retrieved from: https://scitechdaily.com/new-electrochromic-material-can-rapidly-change-color-through-electricity/, Mar. 20, 2021, 5 Pages.

(Continued)

*Primary Examiner* — Grace Q Li
(74) *Attorney, Agent, or Firm* — Michael T. Abramson; Jordan IP Law, LLC

(57)     ABSTRACT

Undesirable light leakage is reduced in a mixed-reality head-mounted display device with a selective color see-through visor by alternatively reflecting or absorbing forward-propagating virtual image light by matching color selection for virtual images generated by a display engine to characteristics of an optical filter that is disposed downstream of an output coupler used in a waveguide combiner. The optical filter is alternatively configured as a static spectral-sensitive filter such as a notch reflector or as a dynamically variable spectral-selective filter that selectively absorbs particular wavelengths of virtual image light responsively to a control voltage signal.

13 Claims, 19 Drawing Sheets

(56) References Cited

U.S. PATENT DOCUMENTS

2023/0273678 A1*  8/2023  Border ............... G02B 27/0189
                                            345/156
2024/0238672 A1*  7/2024  Scharfenberg ........ A63F 13/428

OTHER PUBLICATIONS

Jang, et al., "Ultrafast Black-Color Tunability Of Electrochromic Dimming Films Using Cobalt Polyoxometalate-Anchored Nickel Oxide Nanoparticles", In the Journal of Materials Chemistry A, vol. 11, Issue 6, Jan. 5, 2023, pp. 3038-3050.

International Search Report and Written Opinion received for PCT Application No. PCT/US2024/043783, Nov. 25, 2024, 18 pages.

International Preliminary Report on Patentability (Chapter I) received for PCT Application No. PCT/US2024/043783 mailed on Mar. 26, 2026, 12 pages.

\* cited by examiner

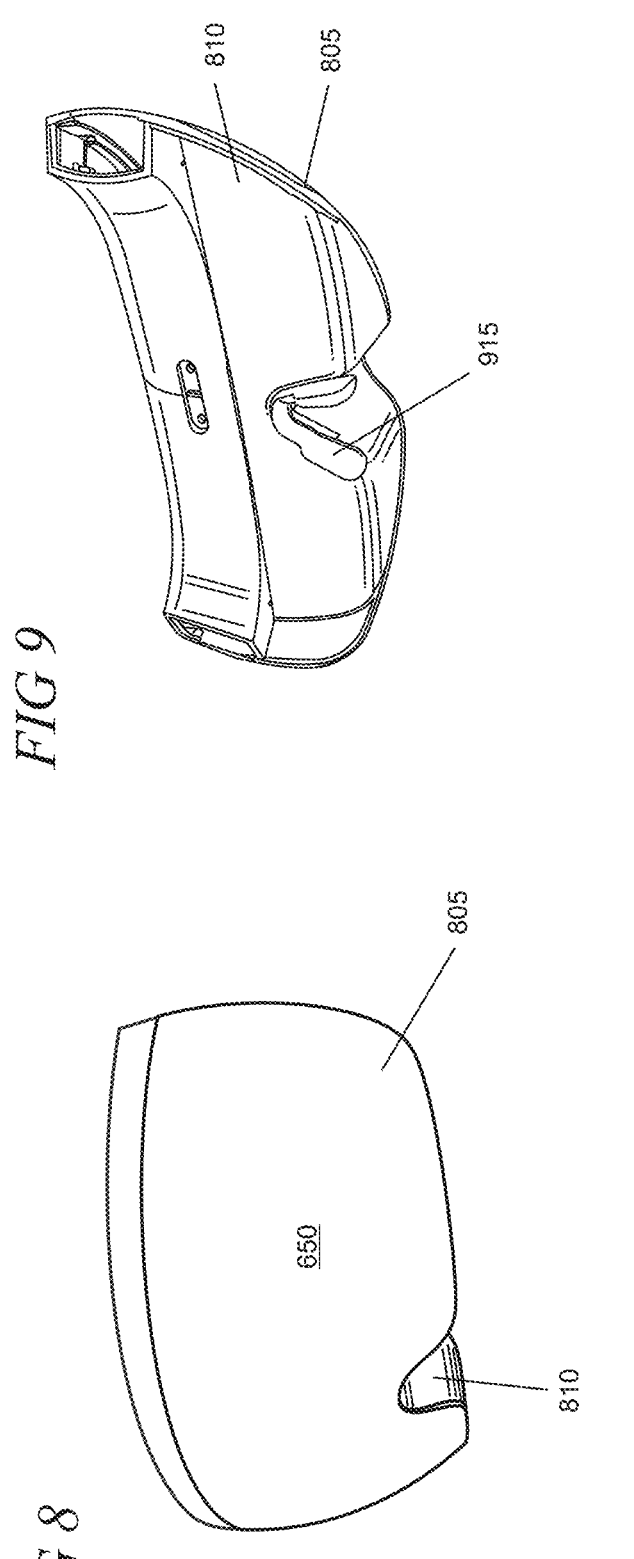
*FIG 9*
*FIG 8*
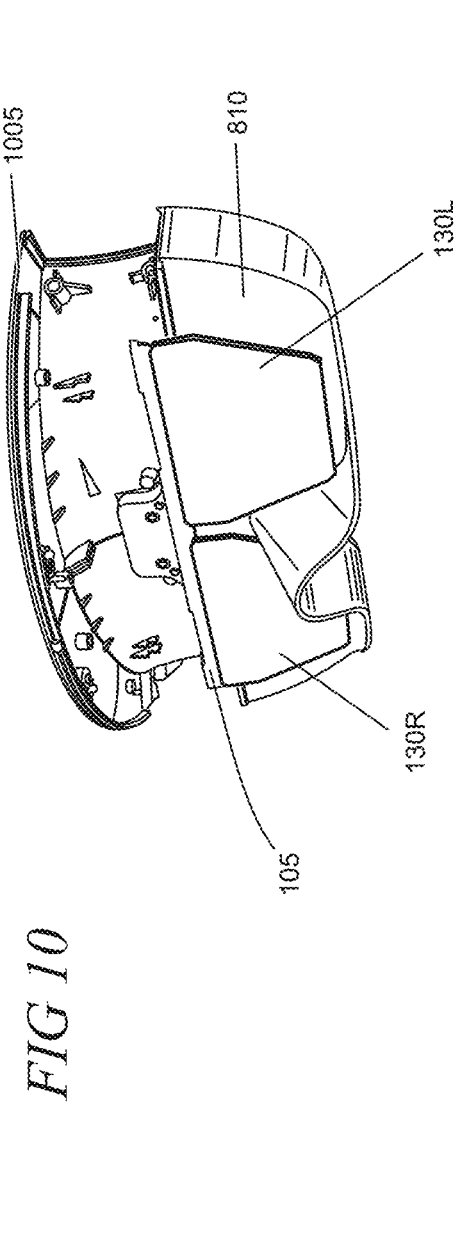
*FIG 10*

105

Elements in the drawing
are not to scale

130

205R

Direction 2 expansion (along vertical axis)

Direction 1 expansion (along horizontal axis )

Entrance pupil

1105

Direction 1 expansion (along horizontal axis )

Expanded exit pupil (1205)

205L

Direction 2 expansion (along vertical axis)

Diagonal FOV

Horizontal FOV

Vertical FOV

1105

Intermediate coupler (1410)

Waveguide (205)

130

Input coupler (1405)

Output coupler (1415)

Elements in the drawing are not to scale

130

130

130

Rearward propagating virtual image light (1610)

Forward propagating virtual image light (1617)

Reflected virtual image light (1715)

Control signals (1702)

Real-world side (1502)

Static spectral-sensitive optical filter (1700)

Input coupler (1615)

Intermediate coupler (1620)

Eye side (1504)

Output coupler (1625)

Controller

415

Display engine

125

115

Elements in the drawing are not to scale

130

Rearward propagating virtual image light (1610)

Forward propagating virtual image light (1617)

Control signals (1802, 1804)

Real-world side (1502)

Eye side (1504)

Dynamically variable spectral-selective optical filter (1800)

Display engine

125

Controller

415

115

Elements in the drawing are not to scale

*FIG 20*

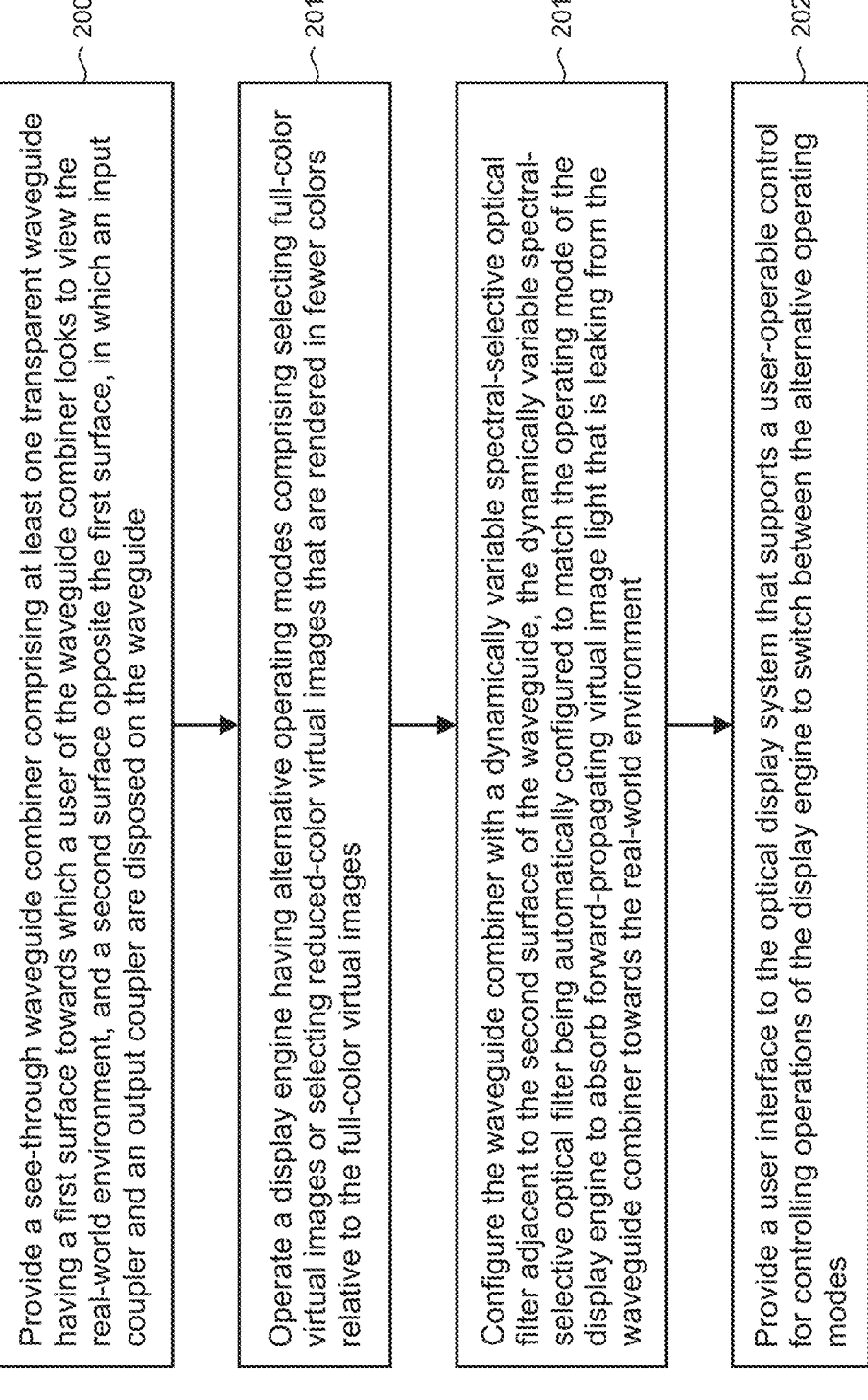

2000

Provide a see-through waveguide combiner comprising at least one transparent waveguide having a first surface towards which a user of the waveguide combiner looks to view the real-world environment, and a second surface opposite the first surface, in which an input coupler and an output coupler are disposed on the waveguide — 2005

Operate a display engine having alternative operating modes comprising selecting full-color virtual images or selecting reduced-color virtual images that are rendered in fewer colors relative to the full-color virtual images — 2010

Configure the waveguide combiner with a dynamically variable spectral-selective optical filter adjacent to the second surface of the waveguide, the dynamically variable spectral-selective optical filter being automatically configured to match the operating mode of the display engine to absorb forward-propagating virtual image light that is leaking from the waveguide combiner towards the real-world environment — 2015

Provide a user interface to the optical display system that supports a user-operable control for controlling operations of the display engine to switch between the alternative operating modes — 2020

HEAD-MOUNTED DISPLAY DEVICE WITH SELECTIVE COLOR SEE-THROUGH VISOR

BACKGROUND

Mixed-reality computing devices, such as head-mounted display (HMD) systems and handheld mobile devices (e.g., smart phones, tablet computers, etc.), may be configured to display images of virtual objects, and/or real objects in a field of view (FOV) of an HMD device user and/or a field of view of a camera of the device. For example, an HMD device may be configured to display, using a see-through display system, virtual environments with real-world objects mixed in, or real-world environments with virtual objects mixed in.

SUMMARY

An optical waveguide-based combiner is incorporated into a see-through visor usable in a mixed-reality head-mounted display (HMD) device. The waveguide combiner includes at least one see-through waveguide through which a user sees the real world. An optical input coupler and output coupler are disposed on the waveguide and respectively arranged to in-couple light for virtual images generated by a display engine and out-couple the virtual images over the real-world views to an eye of the user. The display engine is configured to selectively impart color for the virtual image content displayed to the HMD device user.

The color selection performed by the controller is matched to spectral filtering characteristics of an optical filter that is disposed in the virtual image light path downstream of the output coupler. The optical filter is alternatively configurable as a static spectral-sensitive filter or a dynamically variable spectral-selective filter. By blocking or reflecting light, the optical filter operates to reduce virtual image light that leaks from the waveguide combiner and propagates forward in the direction of the real-world side of the waveguide. The matching of the virtual image light color selection to the filtering parameters of the optical filter advantageously reduces forward propagating light leakage while minimizing the impact on quality of the see-through experience for the HMD device user.

In an illustrative embodiment, a waveguide combiner includes a spectral-sensitive optical filter that is disposed on a backside surface of a see-through waveguide opposite an output coupler that is disposed on the frontside surface. An input coupler on the waveguide in-couples virtual images output by a display engine. The display engine composes the virtual images with less color density compared to full color views seen through the waveguide. For example, the virtual images are composed in a red (i.e., monochromatic) color. The spectral-sensitive optical filter is tuned to match the color density (e.g., monochromatic red) of the virtual images generated by the display engine to reflect the forward propagating light back to the user's eyes.

In another illustrative embodiment, an HMD device includes a display engine configured to selectively generate light for the virtual images from either a full color palette or a reduced color palette having fewer colors relative to the full color palette. The HMD device includes a waveguide combiner having an input coupler configured for in-coupling the virtual image light from the display engine into the waveguide, and an output coupler disposed on the waveguide for out-coupling the virtual images from the waveguide to an eye of the user. The waveguide combiner includes a see-through portion, located on the HMD device in front of the eye of the user when the HMD device is donned, through which the user views the real world.

The HMD device includes a dynamically variable spectral-selective optical filter disposed along a forward-propagating light path extending from the output coupler of the waveguide combiner towards the real world. The HMD device further includes a controller operatively coupled to the display engine and the dynamically variable spectral-selective optical filter. The controller operates to match the selective generation of the virtual images by the display engine with operations of the dynamically variable spectral-selective optical filter such that forward-propagating virtual image light that would otherwise leak from the waveguide combiner towards the real world is absorbed.

An illustrative method is disclosed for reducing light leakage in an optical display system configured to display virtual images in a mixed-reality usage scenario in which virtual images are seen by a user as superimposed over a physical real-world environment. The method includes providing a see-through waveguide combiner comprising at least one transparent waveguide having a first surface towards which a user of the waveguide combiner looks to view the real-world environment, and a second surface opposite the first surface, in which an input coupler and an output coupler are disposed on the waveguide.

A display engine having alternative operating modes is operated to select full-color virtual images or select reduced-color virtual images that are rendered in fewer colors relative to the full-color virtual images. The waveguide combiner is configured with a dynamically variable spectral-selective optical filter adjacent to the second surface of the waveguide. The dynamically variable spectral-selective optical filter is automatically configured to match the operating mode of the display engine to absorb forward-propagating virtual image light that is leaking from the waveguide combiner towards the real-world environment. The method further includes providing a user interface to the optical display system that supports a user-operable control for controlling operations of the display engine to switch between the alternative operating modes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 8 shows a pictorial front view of an illustrative visor used as a component of an HMD device;

FIG. 9 shows a pictorial rear view of an illustrative visor;

FIG. 10 shows a partially disassembled view of an illustrative visor;

FIG. 20 is a flowchart of an illustrative method that implements the present principles;

Like reference numerals indicate like elements in the drawings. Elements are not drawn to scale in the drawings.

DETAILED DESCRIPTION

Light for virtual images in mixed-reality environments that combine images of virtual objects with views of the real world can leak from head-mounted display (HMD) devices and other electronic devices that employ waveguide combiners having optical couplers. Such light is typically considered wasted because it is not used to display virtual images to a device user and thus an energy cost is imposed which is typically undesirable for battery-powered devices. Light leaking from the waveguide combiner that propagates in a forward direction towards the real-world side of the device (as opposed to the rearward direction towards the eye side of the device) is often manifested as "eye glow" which raises security concerns in some mixed-reality HMD device use cases in which detectability of device users is sought to be minimized. Such forward-propagating virtual image light, sometimes referred to as forward-projecting light, can also overlay a user's eyes when seen by an observer. This phenomenon presents social interaction difficulties between mixed-reality HMD device users by limiting eye contact in some use cases.

Undesirable light leakage is reduced in the present HMD device with selective color see-through visor by alternatively reflecting or blocking/absorbing forward-propagating virtual image light by matching color selection for virtual images generated by a display engine to characteristics of an optical filter that is disposed downstream of an output coupler used in a waveguide combiner in mixed-reality applications. The optical filter is alternatively configured as a static spectral-sensitive filter such as a notch reflector comprising layers of dielectric materials in a thin film on an optical substrate or as a dynamically variable spectral-selective filter that selectively blocks particular wavelengths of virtual image light responsively to a control voltage signal. The dynamically variable spectral-selective filter is fabricated, for example, using a lattice structure of covalent organic frameworks (COFs) that are disposed in a thin film on an optical substrate having tunable optical and electrical properties.

The matching of virtual image color selection to the optical filter characteristics advantageously enables virtual image light, that would otherwise be forward propagated, to be blocked and/or reflected back to the user. In some implementations, this increases brightness of the virtual image display on the waveguide combiner without a concomitant increase in electrical power. In addition, reducing the forward-propagating virtual image light that leaks from the waveguide combiner lowers device and user detectability, particularly, for example, in low-light scenarios where eye glow can present a security risk. Reduction in the forward-propagating virtual image light also improves social interaction among mixed-reality device users by reducing virtual image overlay with a user's eyes to facilitate eye contact.

Figures 1, 2:
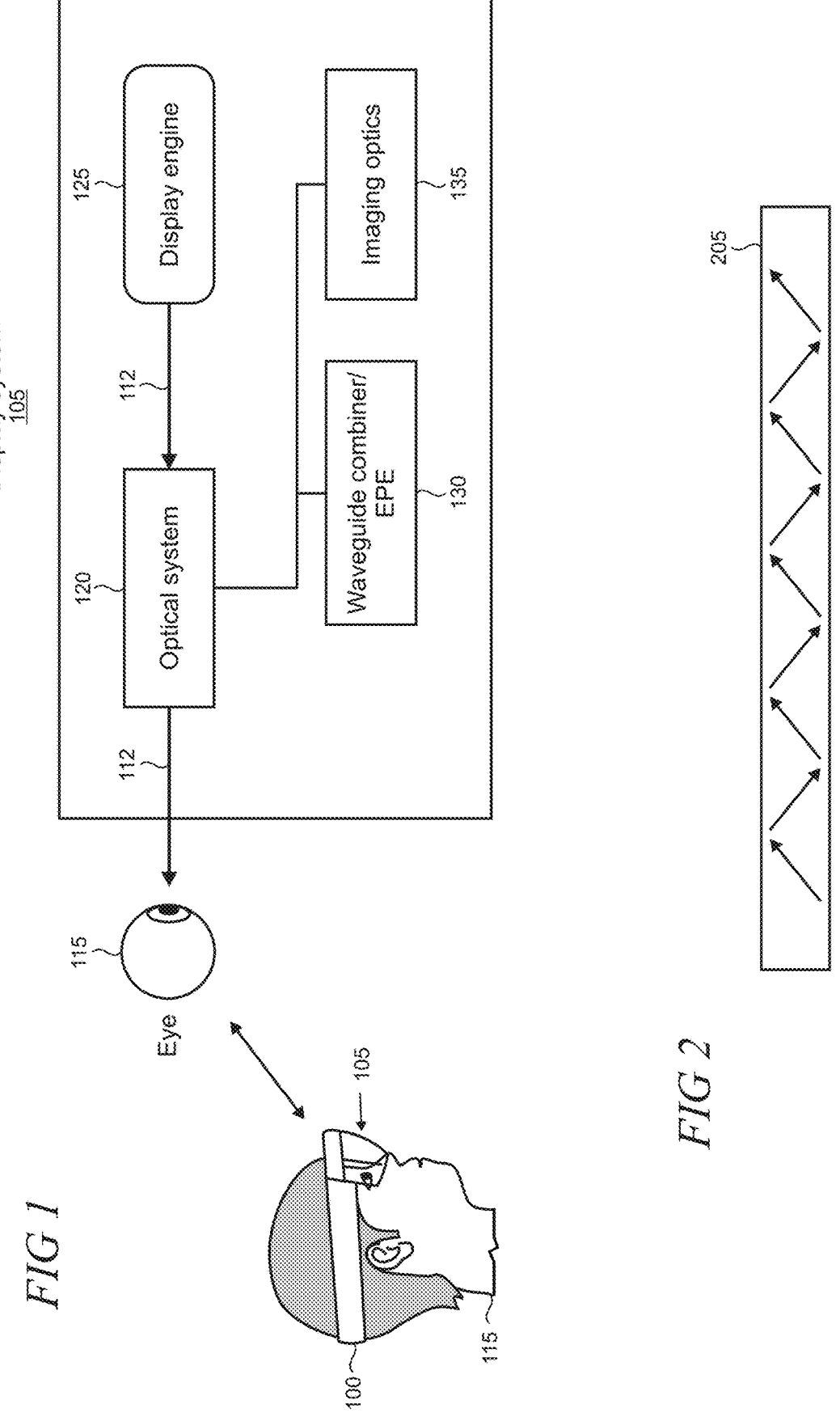
FIG. 1 is a block diagram of an illustrative mixed-reality display system.
FIG. 2 shows propagation of light in a waveguide by total internal reflection (TIR)

Turning now to the drawings, FIG. 1 shows a block diagram of an illustrative display system 105 incorporated into an HMD device 100 that is worn by a user 115. The display system includes a display engine 125 and an optical system 120. The optical system includes a waveguide-based optical combiner (referred to herein as a waveguide combiner 130) and typically includes magnifying and/or collimating optical components (referred to herein as imaging optics 135) to provide virtual images and real-world images over a light path 112. In this illustrative example, the waveguide combiner includes exit pupil expander (EPE) functionalities, as described below.

The display engine 125 in the display system 105 is a source of virtual-world objects or holographic images (collectively referred to herein as "virtual images") that work with the optical system 120 to deliver virtual images as a display to a user's eye 115. The display engine is configurable, for example, using RGB (red, green, blue) light emitting diodes (LEDs) or lasers, LCOS (liquid crystal on silicon) devices, OLED (organic light emitting diode) arrays, MEMS (micro-electro mechanical system) devices, or any other suitable displays or micro-displays operating in transmission, reflection, or emission. The display engine is further configurable in some cases to include electronics such as processors, optical components such as mirrors and/or lenses, and/or mechanical and other components that enable a virtual display to be composed and to provide optical beams for the virtual images as an input to the optical system.

The display system 105 is configurable as a near-eye display in some applications. Near-eye display systems are often used, for example, in HMD devices in industrial, commercial, military, and consumer applications. Other devices and systems also use near-eye display systems, as described below. In a near-eye display system, the display engine does not actually shine the images on a surface such as a glass lens to create the visual display for the user. This is not feasible because the human eye cannot focus on something that is that close. Rather than create a visible image on a surface, the display system uses the optical system 120 to form a pupil and the eye 115 acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the virtual image light after leaving the display system. The exit pupil defines the eyebox which comprises a spatial range of eye positions of the user in which the virtual images projected by the display system are visible.

The waveguide combiner includes a waveguide 205, as shown in FIG. 2, on which multiple optical couplers are disposed, as described below in the text accompanying FIG. 3. The waveguide facilitates virtual image light transmission between the display engine and the eye. One or more waveguides are usable in the display system because they are transparent and because they are generally small and lightweight (which is desirable in applications such as HMD devices where size and weight are generally sought to be minimized for reasons of performance and user comfort). For example, the waveguide can enable the display engine to be located out of the way, for example, on the side of the user's head or near the forehead, leaving only a relatively small, light, and transparent waveguide optical element in front of the eyes.

In an illustrative implementation, the waveguide 205 operates using a principle of total internal reflection (TIR), as shown in FIG. 2, so that light can be coupled among the various optical elements in the display system. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

Figure 3:
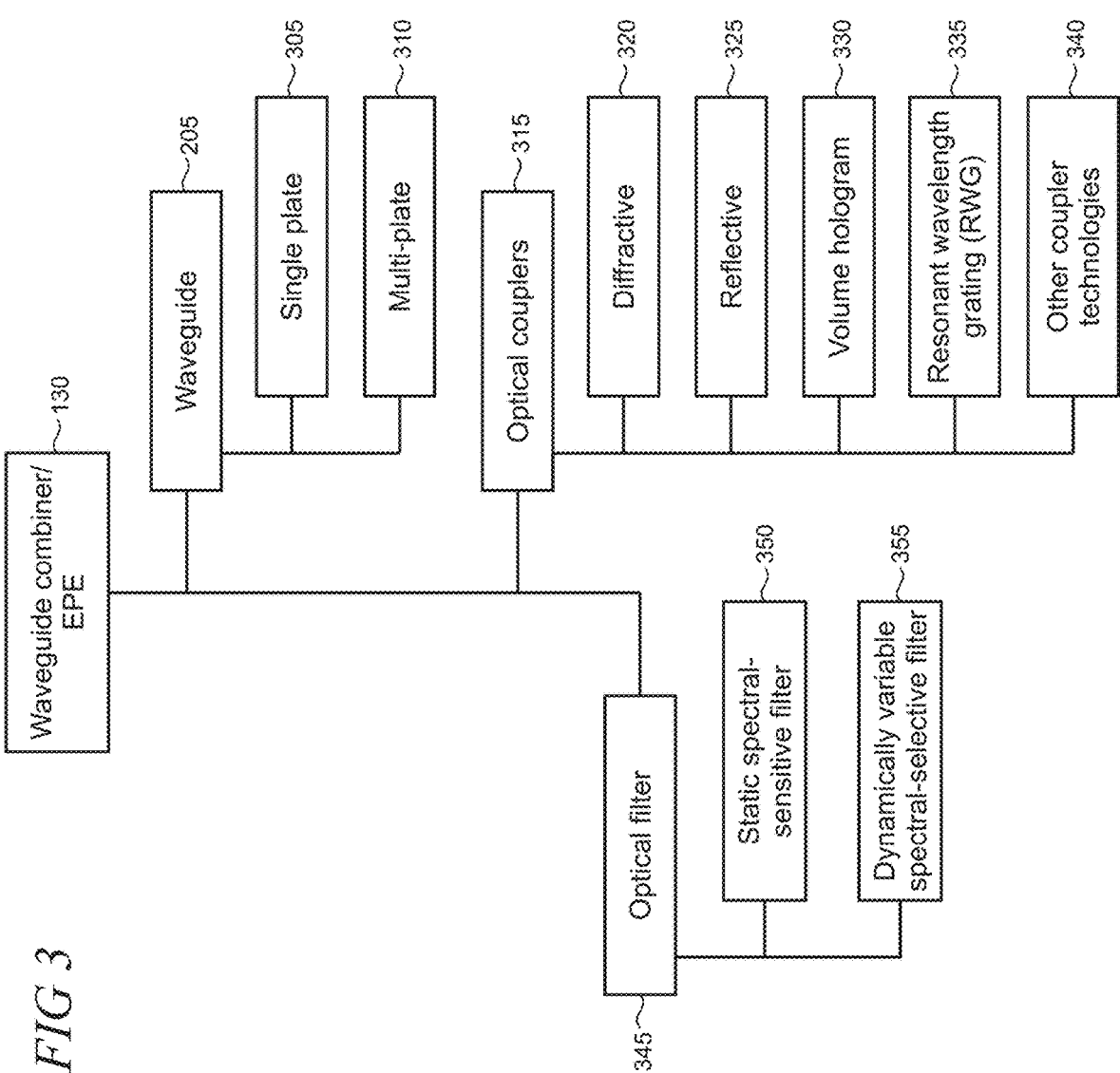
FIG. 3 is a block diagram of an illustrative waveguide combiner having exit pupil expansion (EPE) functionality.

FIG. 3 is a block diagram of an illustrative waveguide combiner 130 having EPE functionality. As noted above, the waveguide combiner includes a waveguide 205. A single waveguide plate 305 is used in some waveguide combiner applications while multiple stacked waveguide plates 310 are used in other applications. For example, a reflective waveguide combiner using optical couplers operating in reflection alternatively utilizes a single plate waveguide for both polychromatic and monochromatic applications. A waveguide combiner using diffractive optical elements (DOEs), such as surface relief gratings (SRGs), typically utilizes a separate waveguide plate to handle each color in a polychromatic color model such as RGB.

The waveguide combiner 130 further includes optical couplers 315, which in typical applications include an input and output coupler. In EPE applications, the waveguide combiner is configurable with an input coupler for in-coupling virtual images into the waveguide, an output coupler for out-coupling virtual images with expanded exit pupil in a first direction, and an intermediate coupler that operates to couple light between the input coupler and output coupler while expanding the exit pupil from the waveguide combiner in a second direction that is orthogonal to the first. The couplers 315 are implementable using a variety of optical technologies. These include diffractive 320, reflective 325, volume hologram 330, resonant wavelength grating (RWG) 335, and other suitable coupler technologies 340, for example, optical metasurfaces.

Various combinations of optical technologies are usable, and optical couplers of different types can be mixed in a given waveguide combiner architecture. For example, an input coupler is implemented using a prism, while the output coupler and/or intermediate coupler are implemented using SRGs.

The waveguide combiner 130 further includes an optical filter 345 comprising a static spectral-sensitive filter 350 and a dynamically variable spectral-selective filter 355. The optical filters 350 and 355 are described in more detail in the text accompanying FIGS. 17 and 18 below.

Figure 4:
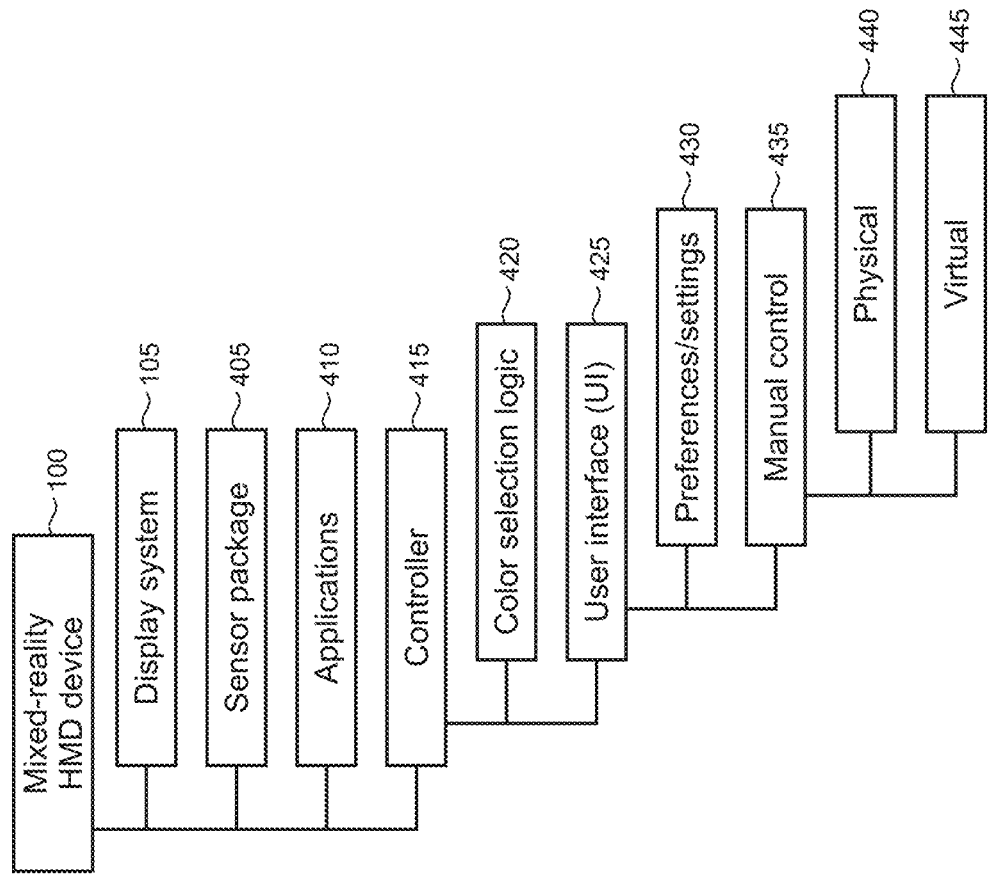
FIG. 4 is a block diagram of an illustrative head-mounted display (HMD) device that is configured with the present selective color see-through visor.

FIG. 4 is a block diagram of an illustrative HMD device 100 that is configured with the present selective color see-through visor. As shown, the HMD device includes a display system 105, a sensor package 405, and various applications 410 that are executable on the device. Components in the sensor package can vary by implementation, but typically include one or more image sensors such as cameras, eye and hand tracking sensors, microphones, global positioning system (GPS) sensors, an inertial measurement unit (IMU), and the like that enable the HMD device to acquire knowledge about the user and environment from which context supporting various device capabilities and mixed-reality user experiences are determined. The HMD device applications can also vary by implementation and may fall within categories including, for example, education/instruction, design and engineering, games and entertainment, travel and navigation, productivity, exercise and recreation, architecture and home design, medicine, and simulation, to list just a few examples.

The HMD device 100 in this illustrative example includes a controller 415 that implements color selection logic 420 to support the reduction in forward-propagating virtual image light that is enabled by the present principles. The application of color selection logic is further described below in the text accompanying FIG. 5.

The controller exposes a user interface (UI) 425 that enables the HMD device user to adjust settings for controller behavior and specify user preferences, as indicated by reference numeral 430. The UI is configurable to facilitate the selection of preset controller behaviors and actions that are triggered upon the occurrence of particular events or when predefined conditions are met. For example, the UI may expose a setting that instructs the controller to select full color for virtual images when the user launches a video game application and an HMD device sensor indicates that the user is stationary. The controller applies color selection logic to determine that virtual content rendering is given priority over see-through quality because the applicable context for the user experience indicates that decreased awareness of the surroundings will not, for example, compromise user safety.

In another example, the user may select a preset through the UI that causes the controller to select monochromatic virtual image rendering and forward-propagation filtering when the context indicates that see-through quality is to be optimized. Turn-by-turn directions are rendered in monochrome on the display system when a vehicular navigation application is launched and the user/device is on the move. The optical filter is tuned to filter just the monochromatic forward-propagating virtual display wavelengths in this context to reduce eye glow, while simultaneously providing for satisfactory visual image quality and maximum user awareness of the environment through the see-through portion of the display. In this use case, monochromatic rendering of the navigation instructions does not typically diminish the quality of information delivery to the user.

The UI includes a manual control 435 in some implementations. The manual control may be implemented as a physical control 440, for example, using a control surface, buttons, or other suitable device. Alternatively, or in addition, the manual control is implemented as a virtual control 445 that may be actuated by the HMD device user, for example, by one or more of voice, gaze, gesture, or motion of the user. Virtual controls are also realizable using constructs such as virtual keyboards, pointing devices, and other virtual implementations of physical controls.

The manual control 435 is configured to enable the user to directly control the HMD device behavior when rendering and filtering virtual images. For example, the user can switch between monochromatic rendering and filtering and full color display using the manual control.

Figure 5:
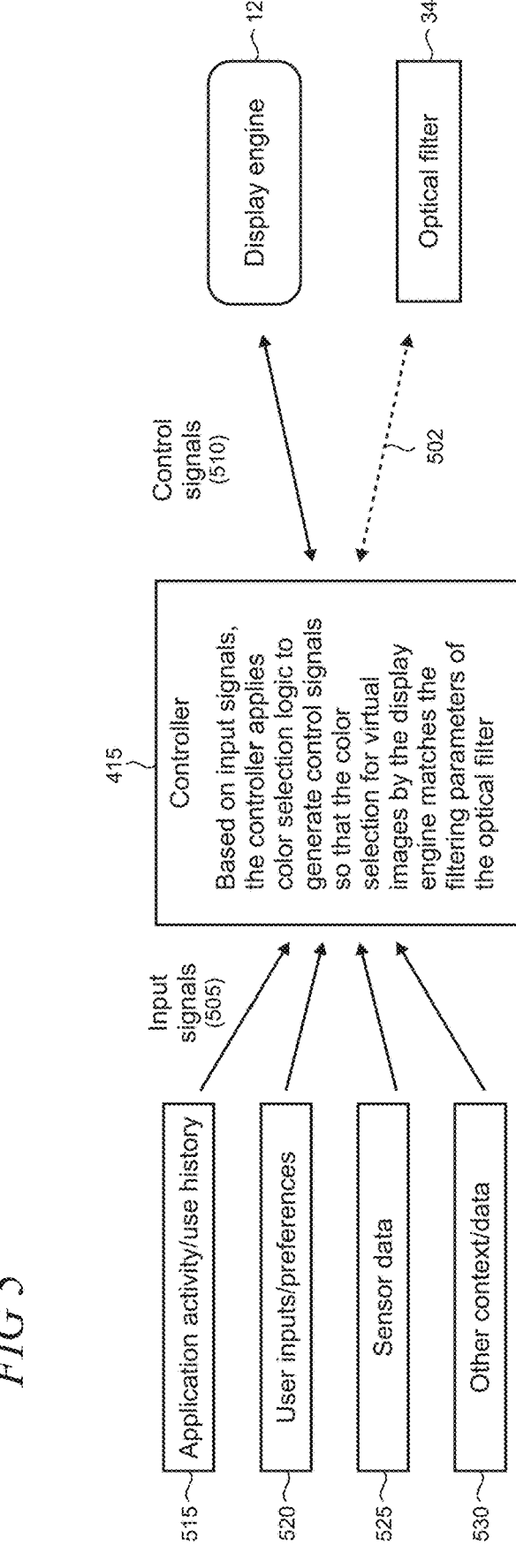
FIG. 5 shows illustrative inputs to a controller that provides control signals as outputs to a display engine and optical filter.

The controller 415 is configurable to use different input sources to drive preset and/or automated behaviors. FIG. 5 shows illustrative input signals 505 to the controller that responsively provides control signals 510 as outputs to a display engine 125 and optical filter 345. It is noted that a control signal is not typically utilized in cases in which the optical filter is configured as a static filter, as indicated by the dashed line 502. In these cases, only the display engine is controlled to implement color selection matching between the engine and optical filter.

As shown, the input signals include application activities and/or application usage history 515, user inputs 520 (including manual inputs and/or inputs for preset behaviors, as discussed above), data 525 from one or more sensors in the HMD sensor package 405 (FIG. 4), and other sources of data or context 530. Based on the input signals, the controller 415 applies color selection logic to generate the control signals 510 so that the color selection for virtual images by the display engine 125 matches the filtering parameters of the optical filter 345.

Figure 6:
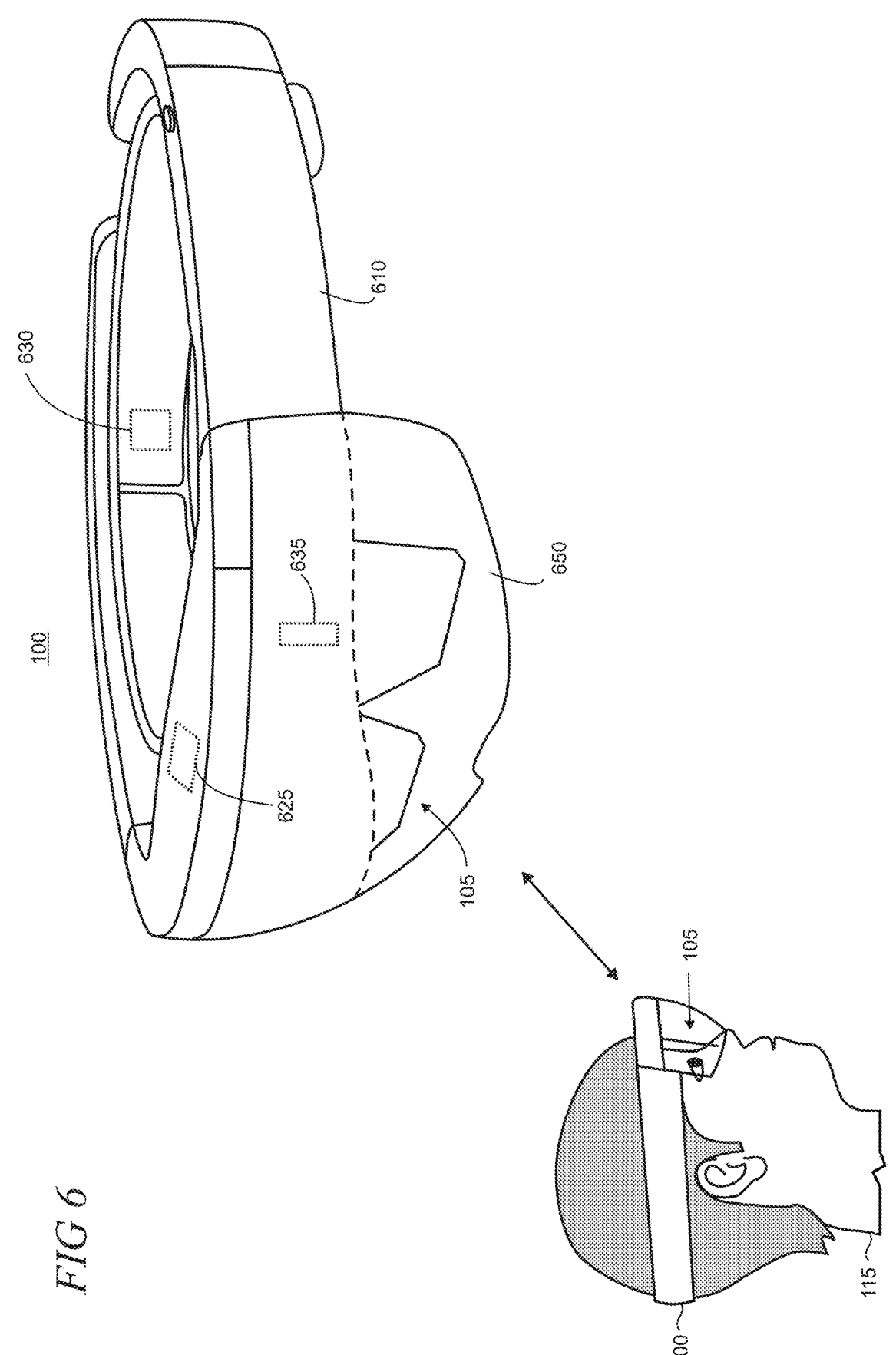
FIG. 6 shows a pictorial partially cutaway view of an illustrative HMD device that is configured with the present selective color see-through visor.

Details of an illustrative HMD device implementation are now presented. FIG. 6 shows a pictorial partially cutaway view of an illustrative HMD device 100 that is configured with the present HMD device with selective color see-through visor. In this example, the HMD device includes a display system 105 and a frame 610 that wraps around the head of a user 115 to position the display system near the user's eyes to provide a virtual-reality or mixed-reality experience to the user. For a mixed-reality experience, the display system is see-through so that the user of the HMD device can view physical, real-world objects in the physical environment over which pixels for virtual objects are overlayed.

The frame 610 further supports additional components of the HMD device 100, including a processor 625, an inertial measurement unit (IMU) 630, and an eye tracker 635. The processor includes logic and associated computer memory configured to receive sensory signals from the IMU and other sensors, to provide display signals to the display system 105, to derive information from collected data, and to enact various control processes described herein. The HMD device includes a transparent visor 650 that protects the display system 105 from damage, for example, due to handling and environmental conditions.

Figure 7:
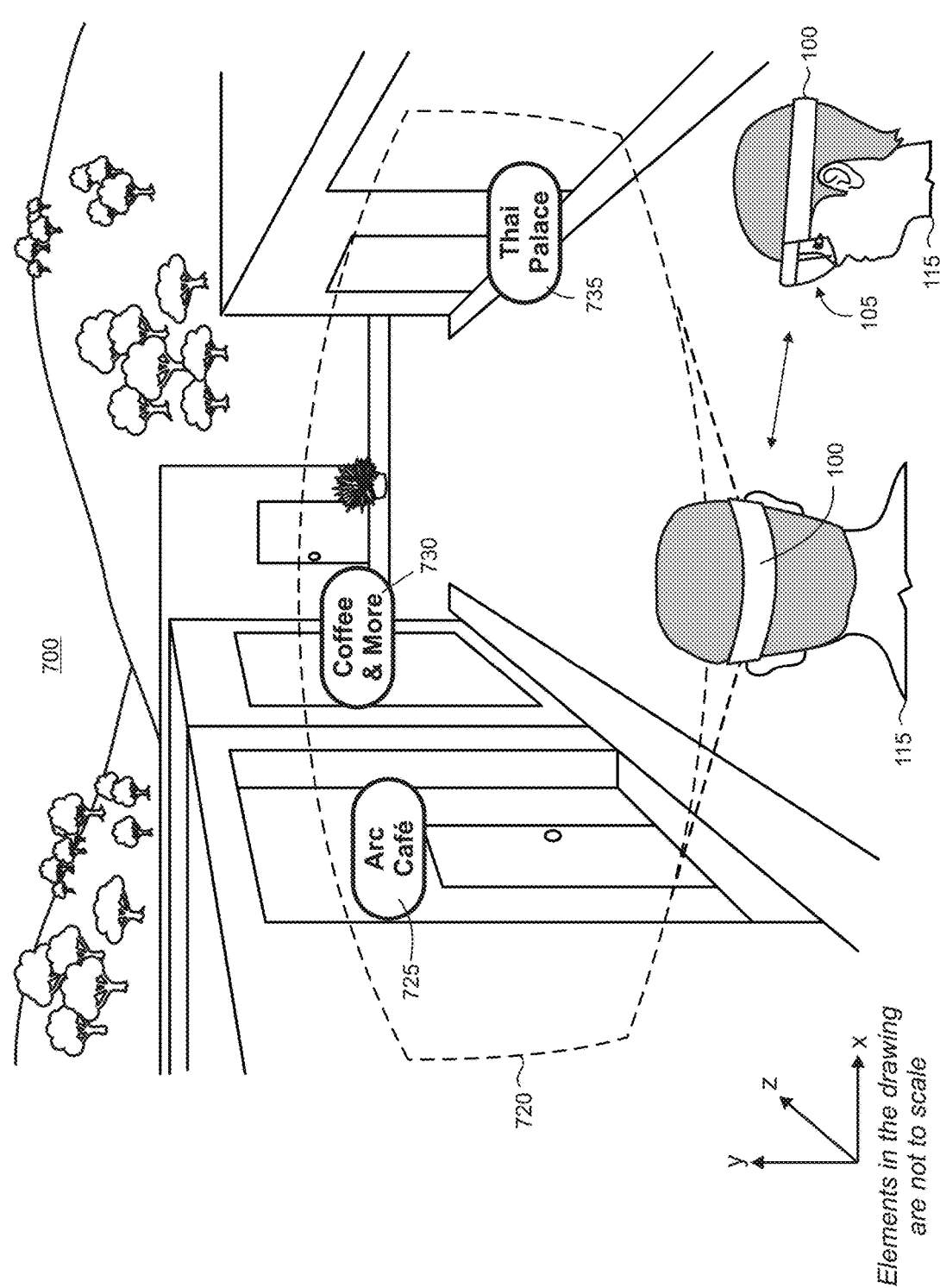
FIG. 7 illustratively shows virtual images that are over-layed on views of the real world within a field of view (FOV) of a mixed-reality HMD device.

FIG. 7 shows the HMD device 100 worn by a user 115 as configured for mixed-reality experiences in which the display system 105 is configured as a near-eye display system having at least a partially transparent, see-through waveguide, among various other components. As noted above, a suitable display engine (not shown) generates virtual images that are guided by the waveguide in the display system to the user. Being see-through, the waveguide in the display system enables the user to perceive light from the real world.

The display system 105 renders images of various virtual objects that are superimposed over the real-world images that are collectively viewed using the see-through waveguide display to thereby create a mixed-reality environment 700 within the HMD device's FOV (field of view) 720. It is noted that the FOV of the real world and the FOV of the images in the virtual world are not necessarily identical, as the virtual FOV provided by the display system is typically a subset of the real FOV. FOV is typically described as an angular parameter in horizontal, vertical, or diagonal dimensions.

It is noted that FOV is just one of many parameters that are typically considered and balanced by HMD device designers to meet the requirements of a particular implementation. For example, such parameters include eyebox size, brightness, transparency and duty time, contrast, resolution, color fidelity, depth perception, size, weight, form-factor, and user comfort (i.e., wearable, visual, and social), among others.

In the illustrative example shown in FIG. 7, the user 115 is physically walking in a real-world urban area that includes city streets with various buildings, stores, etc., with a countryside in the distance. The FOV of the cityscape viewed on HMD device 100 changes as the user moves through the real-world environment and the device can render static and/or dynamic virtual images over the real-world view. In this illustrative example, the virtual images include various tags 725, 730, and 735 identifying restaurant businesses in the city that are superimposed over the entrances to the restaurants. The mixed-reality environment 700 seen visually on the waveguide-based display system is also supplemented by audio and/or tactile/haptic sensations produced by the HMD device in some implementations.

FIGS. 8 and 9 show respective front and rear views of an illustrative example of the visor 650 that incorporates the display system 105 (FIG. 1) that is used in the HMD device 100 as worn by a user 115. The visor, in some implementations, is sealed to protect the internal display system. The visor typically interfaces with other components of the HMD device such as head-mounting/retention systems and other systems including sensors, power management, controllers, etc., as illustratively described in conjunction with FIGS. 21 and 22. Suitable interface elements (not shown) including snaps, bosses, screws, and other fasteners, etc. are incorporated into the visor in some implementations.

The visor 650 includes see-through front and rear shields, 805 and 810 respectively, that are molded using transparent or partially transparent materials to facilitate unobstructed vision to the display system and the surrounding real-world environment. Treatments are optionally applied to the front and rear shields such as tinting, mirroring, anti-reflective, anti-fog, and other coatings, and various colors and finishes are also utilizable. The front and rear shields are affixed to a chassis 1005 shown in the disassembled view in FIG. 10.

The sealed visor 650 physically protects sensitive internal components, including the display system 105, when the HMD device is operated and during normal handling for cleaning and the like. The display system in this illustrative example includes left and right waveguide combiners 130L and 130R that respectively provide virtual images to the user's left and right eyes for mixed- and/or virtual-reality applications. The visor also protects the display system from environmental elements and damage should the HMD device be dropped or bumped, impacted, etc.

As shown in FIG. 9, the rear shield 810 is configured in an ergonomically suitable form 915 to interface with the user's nose, and nose pads and/or other comfort features can be included (e.g., molded-in and/or added-on as discrete components). In some applications, the sealed visor can also incorporate some level of optical diopter curvature (i.e., eye prescription) within the molded shields in some cases.

Figure 11:
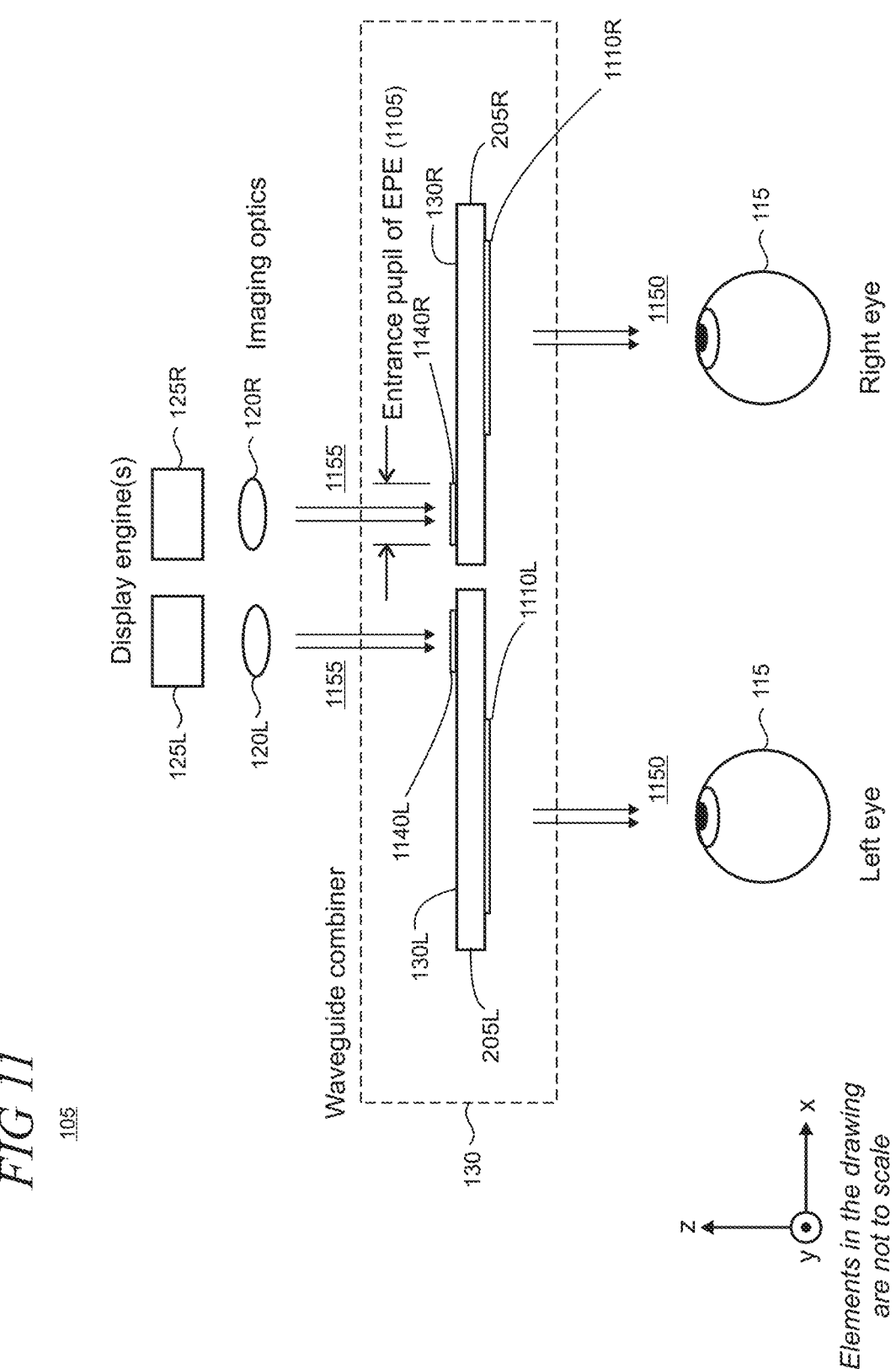
FIG. 11 shows a top view of an illustrative waveguide combiner that includes an exit pupil expander (EPE)

FIG. 11 shows a top view of an illustrative display system 105 that uses separate left and right combiners (130L and 130R), each associated with a respective display engine (125L and 125R) and imaging optics (120L and 120R) to generate, for example, stereo virtual images for the user 115. Each waveguide includes EPE functionality and receives one or more input optical beams from a respective display engine as an entrance pupil 1105 for virtual image light to produce one or more output optical beams with expanded exit pupil relative to the input. The expanded exit pupil typically facilitates a virtual display to be sufficiently sized to meet the various design requirements, such as eyebox size, image resolution, FOV, and the like, of a given optical system while enabling the imager and associated components to be relatively light and compact.

The waveguide combiner 130 utilizes two output couplers, 1110L and 1110R that are supported on the waveguides 205L and 205R and two input couplers 1140L and 1140R. The input and output couplers are configurable using various ones of the technologies shown in FIG. 3 and described in the accompanying text. Intermediate couplers (not shown in FIG. 11) are disposed on the left and right waveguides to provide exit pupil expansion in one direction. The couplers are generally arrangeable in various configurations on the waveguides, for example, on the same side or different sides of the waveguides and may further be single- or double-sided in some implementations. While the waveguide combiner is depicted as having a planar configuration, other shapes may also be utilized including, for example, curved or partially spherical shapes, in which case the optical couplers disposed thereon may be non-co-planar.

Exemplary output beams 1150 from the waveguide combiner 130 are parallel to the exemplary input beams 1155 that are output from the display engines 125 to the input couplers 1140. In some implementations, the input beams are collimated such that the output beams are also collimated, as indicated by the parallel lines in the drawing. Typically, in waveguide-based combiners, the input pupil needs to be formed over a collimated field, otherwise each waveguide exit pupil will produce an image at a slightly different distance. This results in a mixed visual experience in which images overlap with different focal depths in an optical phenomenon known as focus spread.

Figures 12, 13:
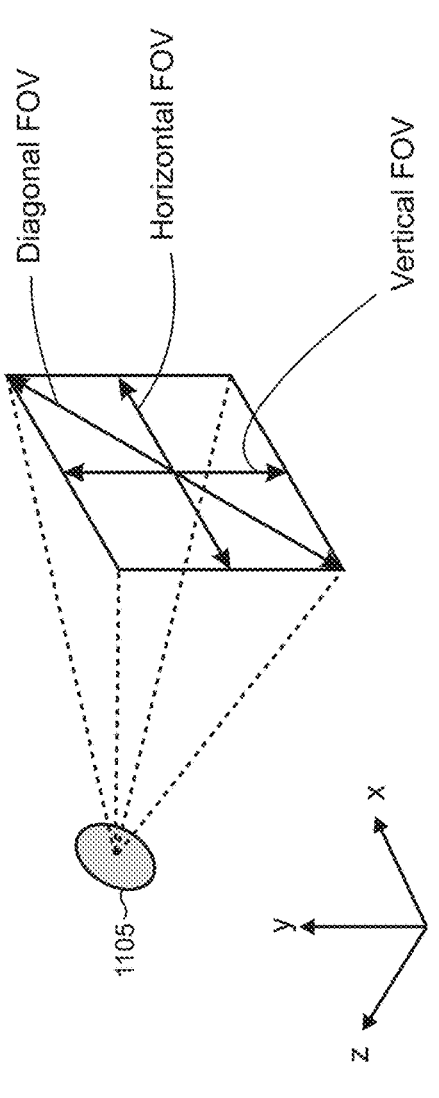
FIG. 12 shows a front view of an illustrative waveguide combiner with an exit pupil expander in which the exit pupil is expanded along two directions of the FOV via pupil replication.
FIG. 13 shows an illustrative input to an exit pupil expander in which the FOV is described by angles in horizontal, vertical, or diagonal orientations.

As shown in FIG. 12, the waveguide combiner 130 is configured to provide an expanded exit pupil 1205 in two directions (i.e., along each of a first and second coordinate axis) compared with the entrance pupil 1105 at the input couplers of the waveguide combiner 130. As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye display system is upright and forward facing, but less intuitive for other usage scenarios. The listed terms are not to be construed to limit the scope of the configurations (and usage scenarios therein) of near-eye display features utilized in the present arrangement.

The entrance pupil 1105 to the waveguide combiner at the input couplers is generally described in terms of FOV, for example, using horizontal FOV, vertical FOV, or diagonal FOV as shown in FIG. 13.

Figure 14:
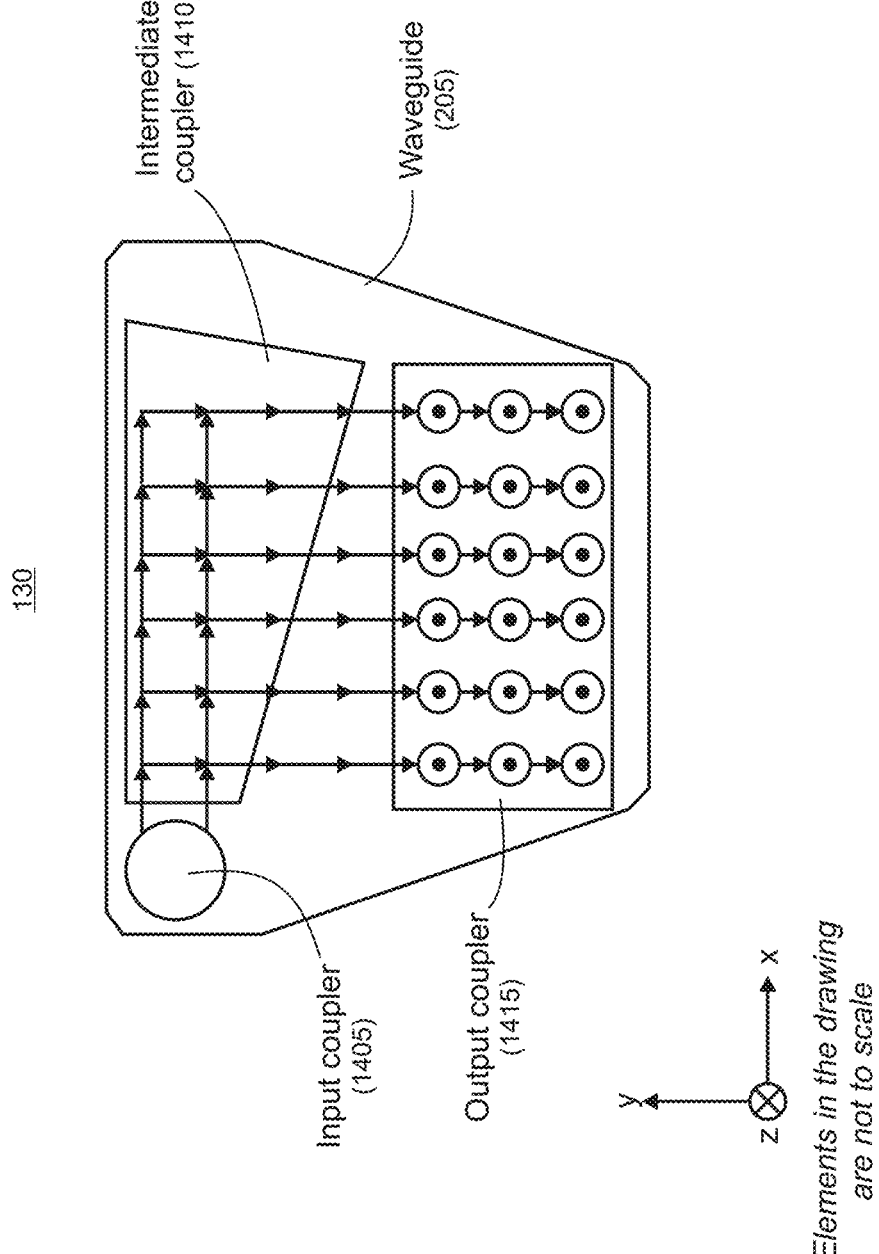
FIG. 14 shows illustrative propagation paths of virtual image light in an arrangement of optical coupling elements in a waveguide combiner.

FIG. 14 shows illustrative propagation paths of virtual image light in an arrangement of optical coupling elements in a waveguide combiner 130. The drawing provides a front view of the waveguide combiner 130 that includes an input coupler 1405, intermediate coupler 1410, and output coupler 1415 disposed on a see-through waveguide 205 that provide in-coupling, exit pupil expansion in two directions, and out-coupling in a mixed-reality environment. The illustrative waveguide combiner shown may be used, for example, with a single eye as a component of a stereo display (in which case another similar waveguide combiner is provided for the other eye), or alternatively is usable by itself in a monoscopic application. The input coupler receives virtual images from a display engine (not shown) and couples them to the intermediate coupler which horizontally expands the exit pupil and couples the virtual image light downwards (i.e., in the negative y direction) to the output coupler. The output coupler vertically expands the exit pupil and out-couples the virtual image light to a user's eye (not shown) with expanded pupil in two directions.

Figure 15:
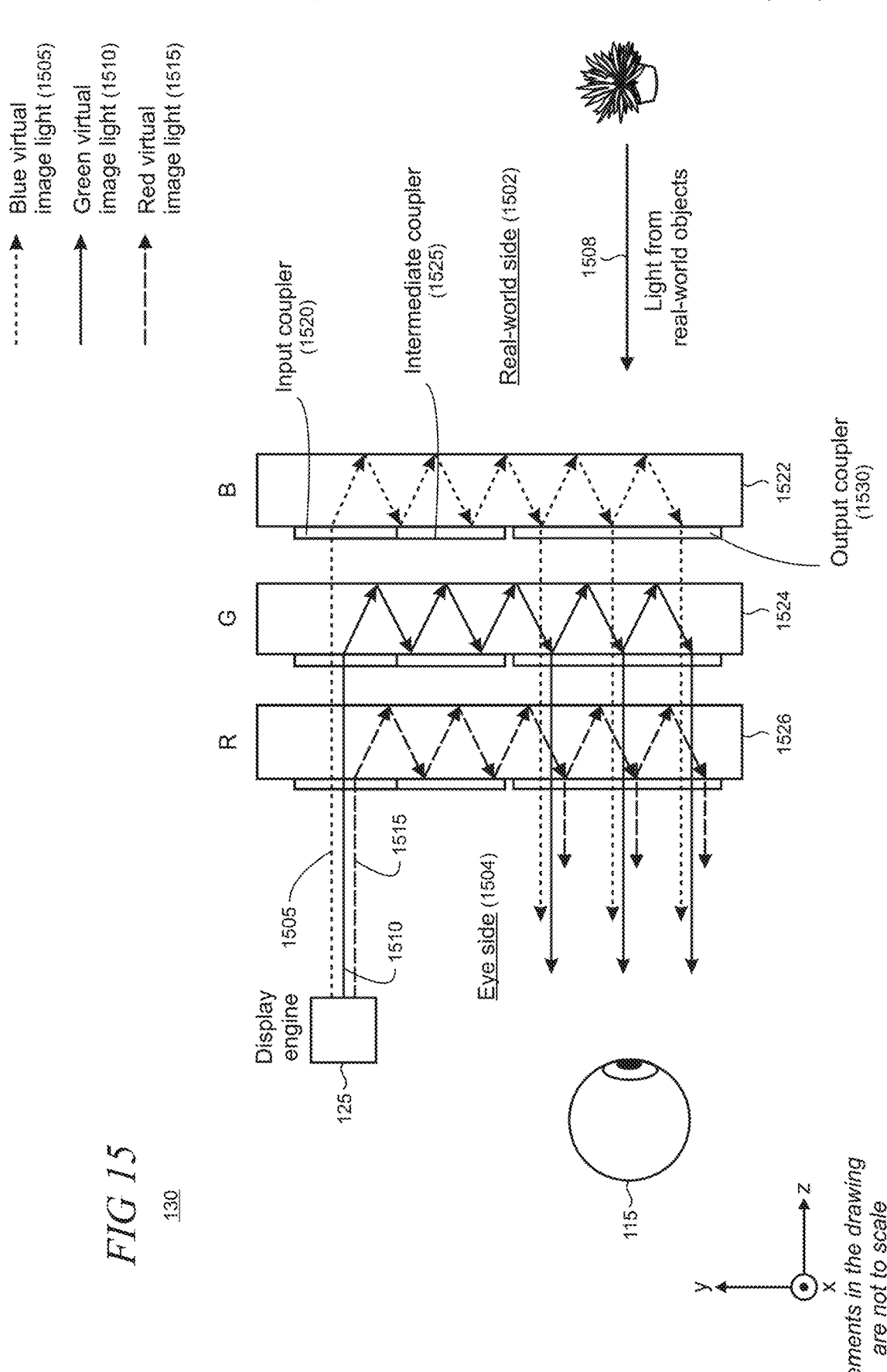
FIG. 15 shows illustrative propagation paths of virtual image light in an arrangement of optical coupling elements in a waveguide combiner.

FIG. 15 is a side view of the waveguide combiner 130 showing propagation of virtual image light through separate waveguide plates for each color of an RGB color model. As shown, the real-world side of the waveguide combiner is indicated by reference numeral 1502 and the eye side by reference numeral 1504. For a given angular range within the FOV, light for each color component 1505, 1510, and 1515 provided by the display engine 125 is in-coupled into respective waveguides 1522, 1524, and 1526 using respective individual input couplers (representatively indicated by element 1520). The virtual image light for each color propagates through the respective intermediate couplers (representatively indicated by element 1525) and the waveguides in TIR and is out-coupled by respective output couplers (representatively indicated by element 1530) to the user's eye 115 with an expanded pupil in the horizontal and vertical directions. The waveguide plates are fabricated from optically transparent materials so that light associated with objects in the real world can be seen through them, as indicated by reference numeral 1508.

Figure 16:
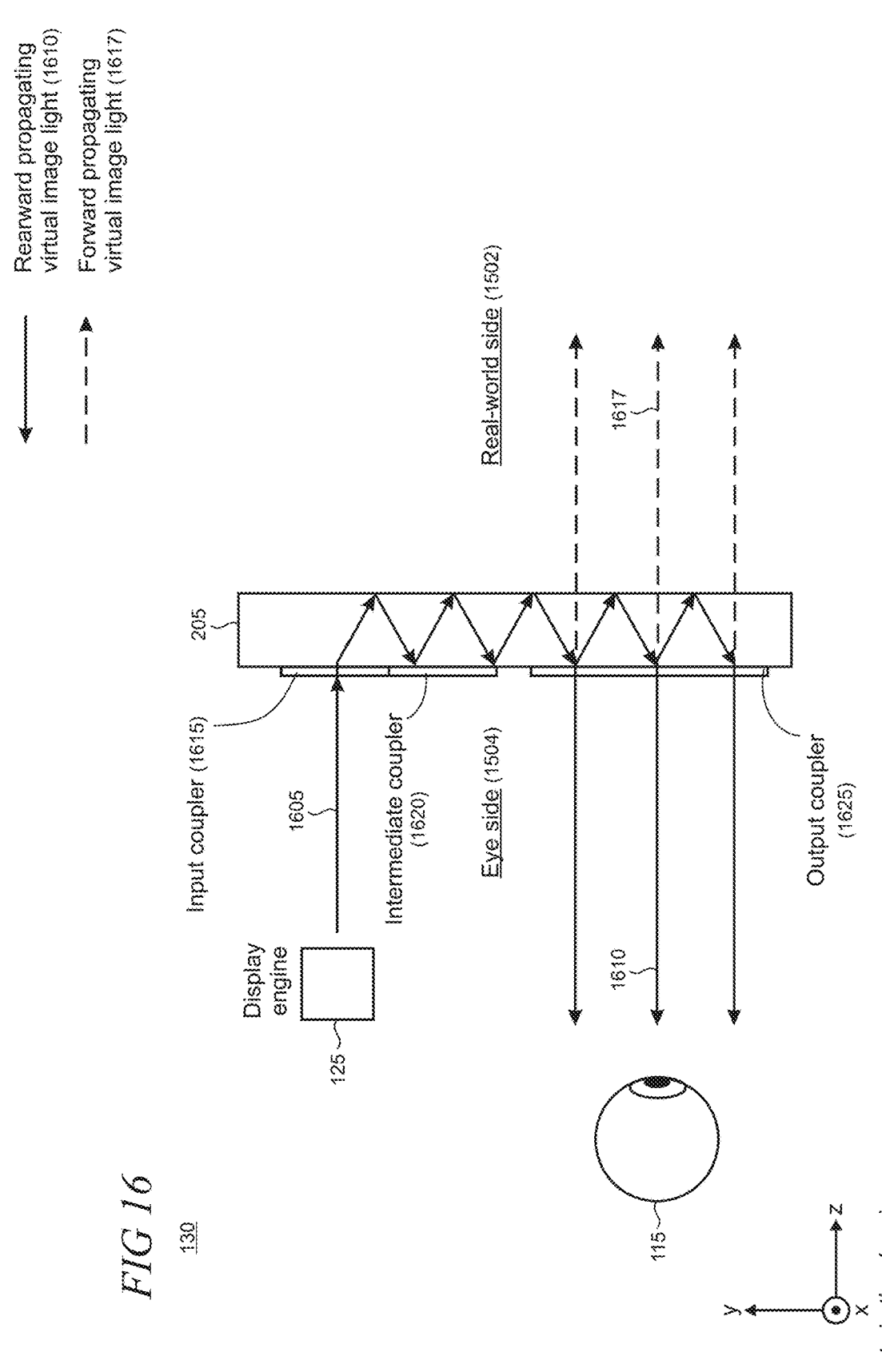
FIG. 16 is a side view of an illustrative waveguide combiner showing virtual image light propagating in forward and backward directions from an output coupler.

FIG. 16 illustratively shows how virtual image light propagates in forward and backward directions from the output coupler 1625. As noted above, only a single waveguide 205 of a waveguide combiner 130 is utilized in this illustrative embodiment. However, it may be appreciated that the principles of operation illustrated in the drawing are applicable to a waveguide combiner that uses multiple waveguide plates. Virtual image light 1605 from the display engine 125 within a particular FOV angle and wavelength is in-coupled by the input coupler 1615. The virtual image light propagates through an intermediate coupler 1620. When the virtual image light propagates to the output coupler 1625, it is diffracted forward (i.e., towards the real-world side 1502 of the waveguide) and rearward (i.e., towards the eye side 1504 of the waveguide and the eye 115 of the user). The distribution between forward and rearward propagation is typically dependent on FOV angle, but on average, is equally split between the two directions.

Unlike the rearward-propagating light 1610, the forward propagating virtual image light 1617 is typically unusable and thus is considered wasted light in some cases. In addition, the forward propagating virtual image light may be visible by others which can be a nuisance in some applications or represent a security risk in other applications where it is desired that an HMD user's location is not revealed, particularly, for example, at nighttime or in dark environments.

Figure 17:
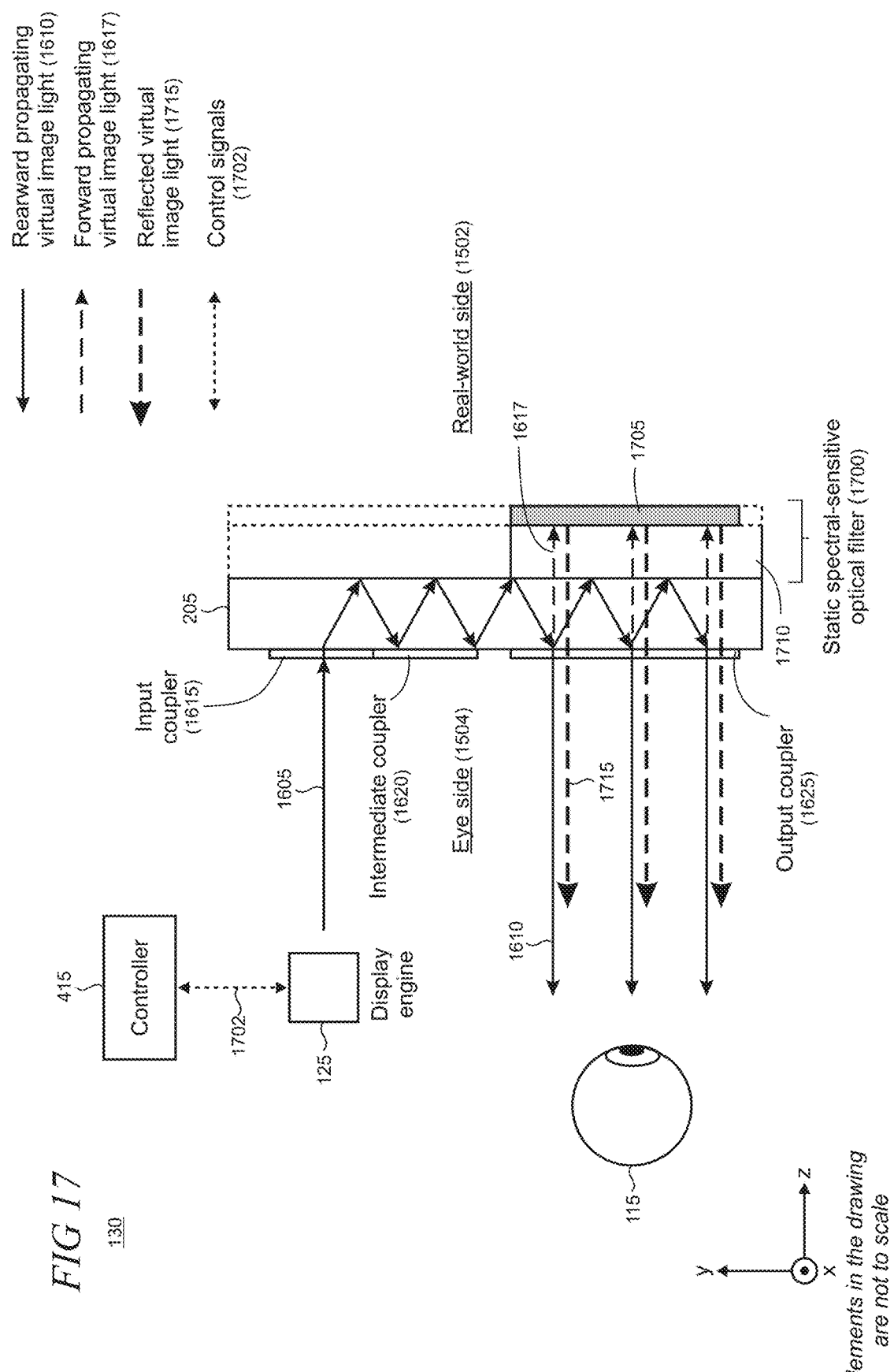
FIG. 17 is a side view of an illustrative waveguide combiner as configured with a spectral-sensitive filter to reflect forward-propagating virtual image light back towards an eye of a user.

FIG. 17 is a side view of the waveguide combiner 130 as configured with a static spectral-sensitive optical filter 1700 to reflect forward-propagating virtual image light back towards an eye of a user 115. In alternative embodiments, the spectral-sensitive optical filter is configured to absorb or block the forward-propagating virtual image light. The spectral-sensitive optical filter comprises a thin film coating 1705 that is disposed on an optical substrate 1710. The thin film comprises a spectral-sensitive coating that is configured to reflect or absorb virtual image light within wavelength ranges output by the display engine 125. The filtering characteristics of the spectral-sensitive optical filter can be tailored to be fairly consistent over a range of angles associated with the FOV of the display to ensure that the luminance associated with the reflected virtual light is acceptably uniform over the entire display.

As shown, the spectral-sensitive optical filter 1700 is located on the real-world side 1502 of the waveguide 205. In some implementations, the spectral-sensitive optical filter is sized and shaped to match the footprint of the output coupler 1625 and associated eyebox. In other implementations, the spectral-sensitive optical filter is sized and shaped to match the footprint of the waveguide 205, as indicated by the dashed lines in the drawing. Utilization of the spectral-sensitive optical filter enables a portion of forward propagating virtual image light 1617 to be reflected back to the eye of the user 115 over the entirety of the eyebox to increase the luminance of the displayed virtual images. The reflected virtual image light is indicated by reference numeral 1715 in the drawing.

The amount of forward-propagating virtual image light that is recovered is dependent on the degree of reflectance that is specified for the static spectral-sensitive filter 1700. Increased reflectance will increase luminance of the virtual images and improve light security of the HMD device with the tradeoff that see-through transmission is reduced. It will be appreciated that the specific balance among virtual image luminance, security, and quality of see-through transmission can be implemented as needed to meet particular application requirements.

As noted above, as the spectral-sensitive optical filter 1700 is configured in this illustrative embodiment as a static filter (i.e., its filtering parameters are fixed and invariant), the controller 415 is configured to provide a control signal 1702 to only the display engine when implementing color selection matching with the optical filter in accordance with the present principles.

In an illustrative embodiment, the thin film coating 1705 comprises single or multiple layers of dielectric materials in which the coating composition and thickness is selected to provide the desired reflectance characteristics over the FOV and bandpass of interest. The thin film coating is generally disposed uniformly across the substrate 1710 so that the real world appears consistently across the entire see-through display for all angles associated with a given FOV that is selected for the waveguide combiner. As reflectance of the thin film coating can be expected to vary as a function of angle, some threshold reflectance can typically be specified that provides a satisfactory function across the FOV range.

An illustrative thin film spectral-sensitive reflective coating includes alternating layers of two different materials that are disposed on a surface of a substrate 1710. The materials each have a different refractive index and may include, for example, silicon dioxide ($SiO_2$), titanium dioxide ($TiO_2$), and aluminum oxide ($Al_2O_3$). In an illustrative embodiment, the layers of different materials are alternately arranged using, for example, silicon dioxide and titanium dioxide. It is noted that the number of layers utilized and their configuration can be expected to vary as necessary to meet the requirements of a particular implementation.

Figure 18:
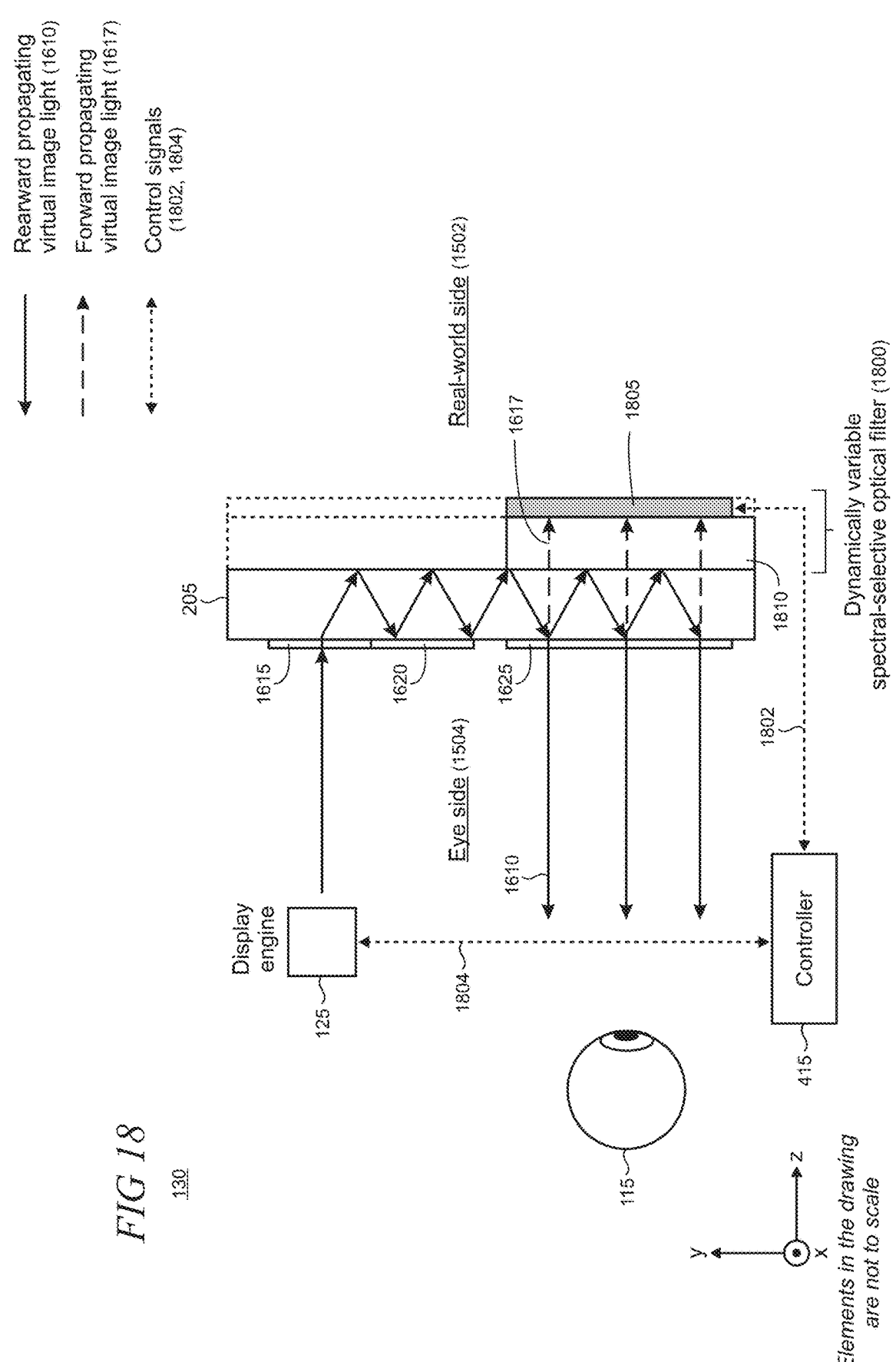
FIG. 18 is a side view of an illustrative waveguide combiner as configured with a dynamically variable spectral-selective optical filter to block or absorb forward-propagating virtual image light.

FIG. 18 is a side view of the waveguide combiner 130 as configured with a dynamically variable spectral-selective optical filter 1800 to block or absorb forward-propagating virtual image light. In alternative embodiments, the dynamically variable spectral-selective optical filter is configured to reflect forward-propagating virtual image light back towards an eye of a user 115. The dynamically variable spectral-selective optical filter comprises a thin film coating 1805 that is disposed on an optical substrate 1810. The thin film comprises a spectral-sensitive coating that is configured to absorb virtual image light within wavelength ranges output by the display engine 125. The thin film may comprise a class of porous coordination polymers, known as covalent organic frameworks (COFs), arranged in a highly ordered lattice, that form a crystalline organic polymer nanostructure having tunable electronic and photoactive properties.

In an illustrative embodiment, the light absorption of the thin film varies by wavelength responsively to application of a control voltage signal 1802 that is provided by the controller 415. The spectral-selective optical filter 1800 is thus configurable with controllable and variable spectral-selectivity. As shown, the controller 415 provides a control signal 1804 to the display engine 125. The control signals 1802 and 1804 are generated by the controller to facilitate color selection matching between the display engine and the spectral-selective optical filter 1800 in accordance with the present principles.

The utilization of a controllable display engine and optical filter enables a greater number of color selection matching scenarios to be realized compared with the static spectral-sensitive optical filter 1700 shown in FIG. 17 and described in the accompanying text above. For example, monochromatic color selection for the virtual images may still be used with corresponding matching at the optical filter, but the colors can be chosen from a larger color palette.

Figure 19B:
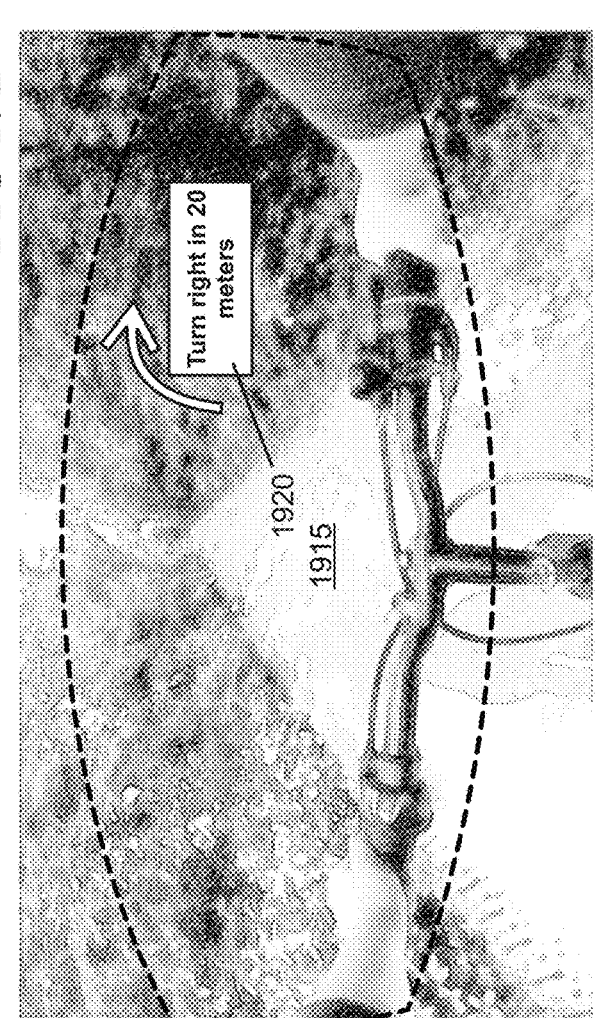
FIGS. 19A and 19B are pictorial presentations of FOVs for an illustrative use case for an HMD device that includes the present selective color see-through visor.
Figure 19A:
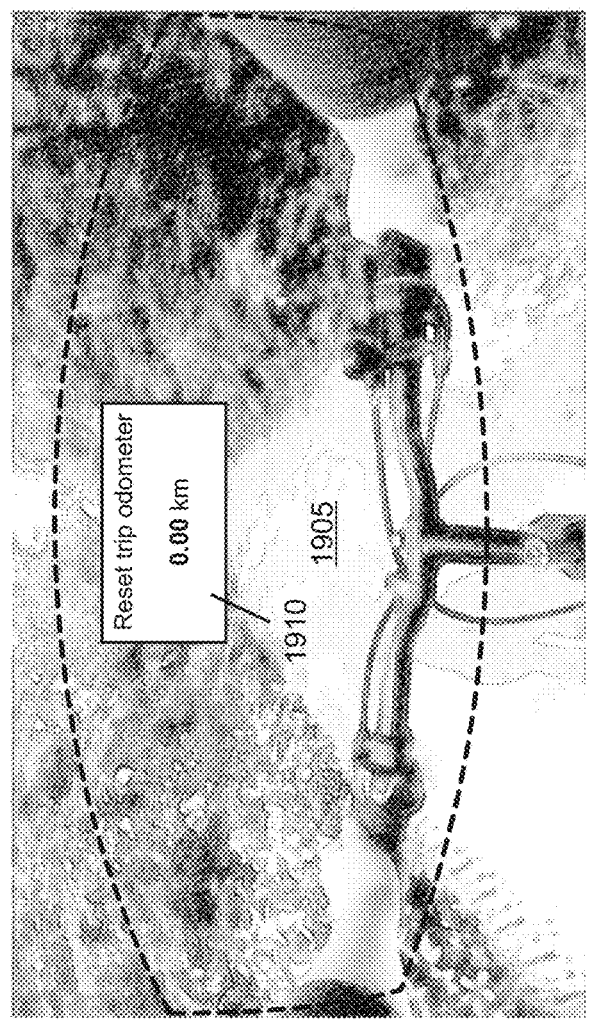

FIGS. 19A and 19B are pictorial presentations of FOVs for an illustrative use case for an HMD device using the controllable display engine 125 and dynamically variable spectral-selective optical filter 1800 discussed above. FIG. 19A shows an FOV 1905 in which a virtual control 1910 is displayed while the user (on a bicycle) is stationary. In this example, the menu is rendered in full color by the display engine, for example, using an RGB color model. Once underway and moving, as shown in FIG. 19B, the user employs a navigation application that displays directions 1920 towards a desired destination in the FOV 1915. The directions are rendered using a reduced color palette (for example, in monochromatic red) to ensure that the quality of the see-through display is maximized so that the user can maintain appropriate situational awareness while riding the bicycle.

FIG. 20 is a flowchart 2000 of an illustrative method for reducing light leakage in an optical display system configured to display virtual images in a mixed-reality usage scenario in which virtual images are seen by a user as superimposed over a physical real-world environment. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps are optionally utilized.

Block 2005 includes providing a see-through waveguide combiner comprising at least one transparent waveguide having a first surface towards which a user of the waveguide combiner looks to view the real-world environment, and a second surface opposite the first surface, in which an input coupler and an output coupler are disposed on the waveguide. Block 2010 includes operating a display engine having alternative operating modes comprising selecting full-color virtual images or selecting reduced-color virtual images that are rendered in fewer colors relative to the full-color virtual images.

Block 2015 includes configuring the waveguide combiner with a dynamically variable spectral-selective optical filter adjacent to the second surface of the waveguide, the dynamically variable spectral-selective optical filter being automatically configured to match the operating mode of the display engine to absorb forward-propagating virtual image light that is leaking from the waveguide combiner towards the real-world environment. Block 2020 includes providing a user interface to the optical display system that supports a user-operable control for controlling operations of the display engine to switch between the alternative operating modes.

Figure 21:
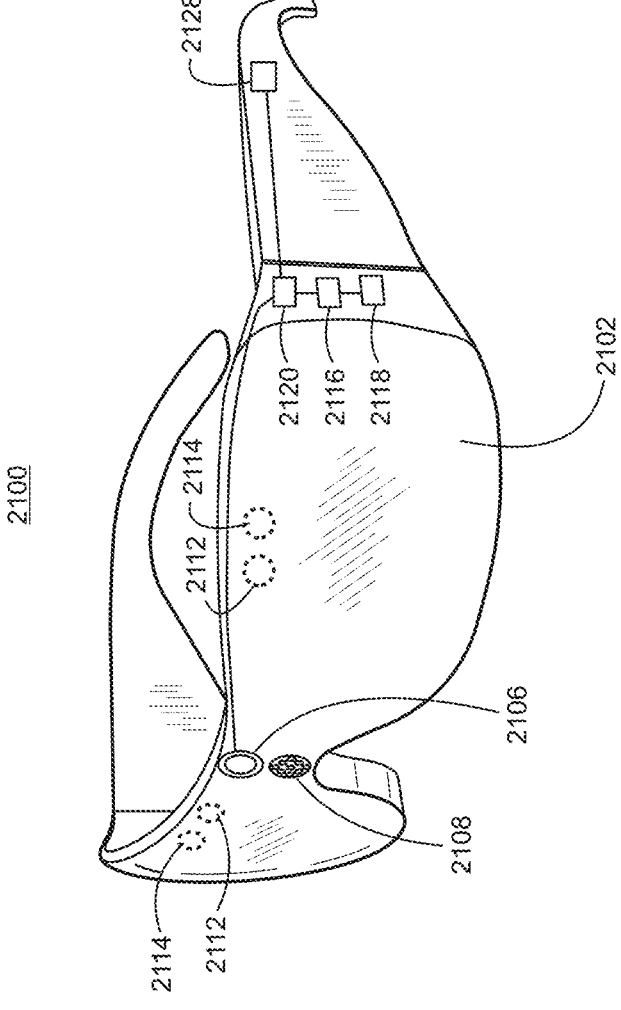
FIG. 21 is a pictorial view of an illustrative example of a mixed-reality HMD device that is configurable to use the present selective color see-through visor.
Figure 22:
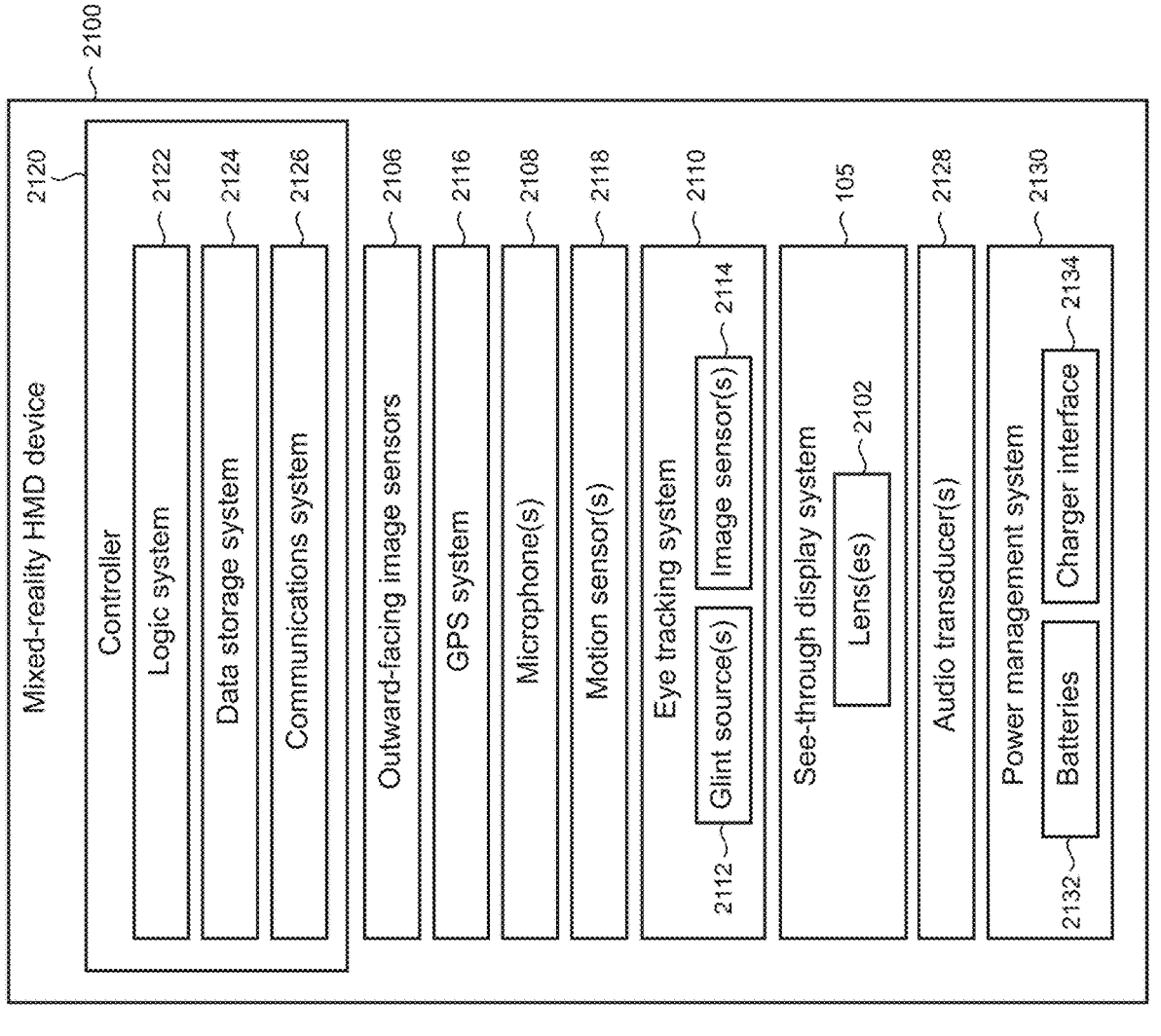
FIG. 22 shows a block diagram of an illustrative example of a mixed-reality HMD device that is configurable to use the present selective color see-through visor.

The present selective color see-through visor may be utilized in HMD devices having a variety of form factors and features. FIG. 21 shows one particular illustrative example of a mixed-reality HMD device 2100, and FIG. 22 shows a functional block diagram of the device 2100. The HMD device comprises one or more lenses 2102 that form a part of a see-through display system 105, so that images are displayed using lenses 2102 (e.g., using projection onto lenses 2102, one or more waveguide systems, such as a near-eye display system, incorporated into the lenses 2102, and/or in any other suitable manner).

The HMD device 2100 further comprises one or more outward-facing image sensors 2106 configured to acquire images of a background scene and/or physical environment being viewed by a user and includes one or more microphones 2108 configured to detect sounds, such as voice commands from a user. Outward-facing image sensors 2106 include one or more depth sensors and/or one or more two-dimensional image sensors. In alternative arrangements, as noted above, a mixed-reality or virtual-reality display system, instead of incorporating a see-through display system, displays mixed-reality or virtual-reality images through a viewfinder mode for an outward-facing image sensor.

The HMD device 2100 further includes an eye tracking system 2110 configured for detecting a direction of gaze of each eye of a user or a direction or location of focus, as described above. The eye tracking system is configured to determine gaze directions of each of a user's eyes in any suitable manner. For example, in the illustrative example shown, the eye tracking system includes one or more glint sources 2112, such as infrared light sources, that are configured to cause a glint of light to reflect from each eyeball of a user, and one or more image sensors 2114, such as inward-facing sensors, that are configured to capture an image of each eyeball of the user. Changes in the glints from the user's eyeballs and/or a location of a user's pupil, as determined from image data gathered using the image sensor(s) 2114, are used to determine a direction of gaze.

In addition, a location at which gaze lines projected from the user's eyes intersect the external display is used to determine an object at which the user is gazing (e.g., a displayed virtual object and/or real background object). The eye tracking system 2110 has any suitable number and arrangement of light sources and image sensors. In some implementations, the eye tracking system may be omitted.

The HMD device 2100 also includes additional sensors in some embodiments. For example, HMD device 2100 includes a global positioning system (GPS) system 2116 to allow a location of the HMD device 2100 to be determined. This may help to identify real-world objects, such as buildings, etc., that are located in the user's adjoining physical environment.

The HMD device 2100 further includes one or more motion sensors 2118 (e.g., inertial, multi-axis gyroscopic, or acceleration sensors) to detect movement and position/orientation/pose of a user's head when the user is wearing the system as part of a mixed reality or virtual reality HMD device. Motion data is usable, potentially along with eye-tracking glint data and outward-facing image data, for gaze detection, as well as for image stabilization to help correct for blur in images from the outward-facing image sensor(s) 2106. The use of motion data allows changes in gaze direction to be tracked even if image data from outward-facing image sensor(s) 2106 cannot be resolved.

In addition, motion sensors 2118, as well as microphone(s) 2108 and eye tracking system 2110, are employable as user input devices, such that a user interacts with the HMD device 2100 via gestures of the eye, neck and/or head, as well as via verbal commands in some cases. It may be understood that sensors illustrated in FIGS. 21 and 22 and described in the accompanying text are included for the purpose of example and are not intended to be limiting in any manner, as any other suitable sensors and/or combination of sensors are utilizable to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) are utilizable in some implementations.

The HMD device 2100 further includes a controller 2120 such as one or more processors having a logic system 2122 and a data storage system 2124 in communication with the sensors, eye tracking system 2110, display system 105, and/or other components through a communications system 2126. The communications system 2126 facilitates the display system being operated in conjunction with remotely located resources, such as processing, storage, power, data, and services. That is, in some implementations, an HMD device is operable as part of a system that distributes resources and capabilities among different components and systems.

The storage system 2124 includes instructions stored thereon that are executable by logic system 2122, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2100 is configured with one or more audio transducers 2128 (e.g., speakers, earphones, etc.) so that audio can be utilized as part of a mixed-reality or virtual-reality experience. A power management system 2130 includes one or more batteries 2132 and/or protection circuit modules (PCMs) and an associated charger interface 2134 and/or remote power interface for supplying power to components in the HMD device 2100.

It may be appreciated that the HMD device 2100 is described for the purpose of example, and thus is not meant to be limiting. It may be further understood that the display system includes, in some embodiments, additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 23:
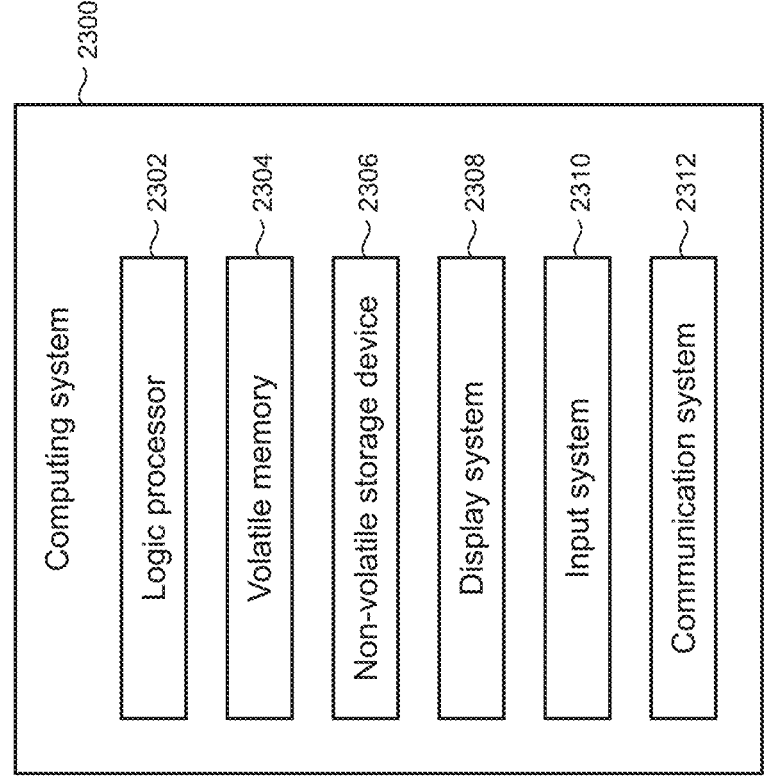
FIG. 23 shows a block diagram of an illustrative electronic device that incorporates a mixed-reality display system using principles enabled by the present selective color see-through visor.

FIG. 23 schematically shows an illustrative example of a computing system 2300 that can enact one or more of the systems, features, functions, methods and/or processes described above for the present HMD device with selective color see-through visor. The computing system is shown in simplified form. The computing system generally takes the form of one or more personal computers, server computers, tablet computers, home-entertainment computers, network computing devices, gaming devices, mobile computing devices, mobile communication devices (e.g., smartphones), wearable computers, and/or other computing devices.

The computing system 2300 includes a logic processor 2302, a volatile memory 2304, and a non-volatile storage device 2306. The computing system optionally includes a display system 2308, input system 2310, communication system 2312, and/or other components not shown in FIG. 23.

The logic processor 2302 includes one or more physical devices configured to execute instructions. For example, the logic processor is configurable to execute instructions that are part of one or more applications, services, programs, routines, libraries, objects, components, data structures, or other logical constructs. Such instructions are typically implemented to perform a task, implement a data type, transform the state of one or more components, achieve a technical effect, or otherwise arrive at a desired result.

The logic processor 2302 includes one or more processors configured to execute software instructions. In addition, or alternatively, the logic processor includes one or more hardware or firmware logic processors configured to execute hardware or firmware instructions. Processors of the logic processor are alternatively configured as single-core or multi-core, and the instructions executed thereon are configurable for sequential, parallel, and/or distributed processing. Individual components of the logic processor are optionally distributed among two or more separate devices, which may be remotely located and/or configured for coordinated processing. Aspects of the logic processor are virtualized and executed by remotely accessible, networked computing devices configured in a cloud-computing configuration. In such a case, these virtualized aspects are run on different physical logic processors of various different machines.

The non-volatile storage device 2306 includes one or more physical devices configured to hold instructions executable by the logic processors to implement the methods and processes described herein. When such methods and processes are implemented, the state of the non-volatile storage device may be transformed—e.g., to hold different data.

The non-volatile storage device 2306 includes physical devices that are removable and/or built-in. The non-volatile storage device includes optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. The non-volatile storage device includes non-volatile, dynamic, static, read/write, read-only, sequential-access, location-addressable, file-addressable, and/or content-addressable devices. It will be appreciated that the non-volatile storage device is configured to hold instructions even when power is cut to the non-volatile storage device.

The volatile memory 2304 includes physical devices that include random access memory. The volatile memory is typically utilized by the logic processor 2302 to temporarily store information during processing of software instructions. It will be appreciated that the volatile memory typically does not continue to store instructions when power is cut to the volatile memory.

Aspects of logic processor 2302, volatile memory 2304, and non-volatile storage device 2306 are capable of integration into one or more hardware-logic components. Such hardware-logic components include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" is typically used to describe an aspect of computing system 2300 implemented in software by a processor to perform a particular function using portions of volatile memory, which function involves transformative processing that specially configures the processor to perform the function. Thus, a program is instantiated via the logic processor 2302 executing instructions held by the non-volatile storage device 2306, using portions of the volatile memory 2304. It will be understood that different programs are instantiated from the same application, service, code block, object, library, routine, API (application programming interface), function, etc. Likewise, the same program is instantiated by different applications, services, code blocks, objects, routines, APIs, functions, etc. A program encompasses individual or groups of executable files, data files, libraries, drivers, scripts, database records, etc.

The display system 2308, when included, is usable to present a visual representation of data held by the non-volatile storage device 2306. This visual representation may take the form of a graphical user interface (GUI). As the herein described methods and processes change the data held by the non-volatile storage device, and thus transform the state of the non-volatile storage device, the state of the display system 2308 is likewise transformed to visually represent changes in the underlying data. The display system includes one or more display devices utilizing virtually any type of technology; however, one utilizing a MEMS projector to direct laser light may be compatible with the eye-tracking system in a compact manner. Such display devices are combinable with the logic processor 2302, volatile memory 2304, and/or non-volatile storage device 2306 in a shared enclosure, or such display devices include peripheral display devices.

The input system 2310, when included, comprises or interfaces with one or more user-input devices such as a keyboard, mouse, touch screen, or game controller. In some embodiments, the input system comprises or interfaces with selected natural user input (NUI) componentry. Such componentry is integrated or peripheral, and the transduction and/or processing of input actions is handled on- or off-board. Example NUI componentry includes a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The communication system 2312, when included, is configured to communicatively couple various computing devices described herein with each other, and with other devices. The communication system includes wired and/or wireless communication devices compatible with one or more different communication protocols. As non-limiting examples, the communication system is configurable for communication via a wireless telephone network, or a wired or wireless local- or wide-area network. In some embodiments, the communication system allows computing system 2300 to send and/or receive messages to and/or from other devices via a network such as the Internet.

Various exemplary embodiments of the present head-mounted display device with selective color see-through visor are now presented by way of illustration and not as an exhaustive list of all embodiments. An example includes a waveguide combiner usable in a mixed-reality environment in which virtual images are displayed by the waveguide combiner over a user's views of a real world, comprising: a see-through waveguide through which the user views the real world, the waveguide having a frontside surface facing an eye of the user and a backside surface facing the real world; an input coupler disposed on the waveguide configured to in-couple virtual images output by a display engine into the waveguide, wherein the virtual images are composed with less color density relative to the views of the real world; an output coupler disposed on the frontside surface of the waveguide configured to out-couple virtual images from the waveguide to the eye of the user; and a spectral-sensitive optical filter disposed on the backside surface of the waveguide and located along a forward-propagating light path extending from the output coupler of the waveguide combiner towards the real world, wherein the spectral-sensitive filter reflects forward-propagating virtual image light out-coupled from the output coupler towards the real world back to an eye of the user, wherein the spectral-sensitive optical filter is matched to the color density of the virtual images generated by the display engine.

In another example, the display engine outputs mono-chromatic virtual image light, and the spectral-sensitive optical filter comprises a static optical filter having a band-pass matching the composition of the display engine output. In another example, the display engine outputs virtual image light according to an RGB (red, green, blue) color model, and the spectral-sensitive optical filter comprises a bandpass matching the display engine output. In another example, the spectral-sensitive optical filter comprises a dynamically variable spectral-selective filter that is matched to the color density of the virtual images. In another example, the waveguide combiner further comprises a controller and the dynamically variable spectral-selective filter comprises an electrochromic material in which color selectivity is based on an applied voltage signal from the controller, the electrochromic material comprising covalent organic frameworks. In another example, the waveguide combiner further comprises a controller and the dynamically variable spectral-selective filter comprises an electrochromic dimming device comprising a layer of voltage-sensitive nanoparticles in which color selectivity is based on an applied voltage signal from the controller. In another example, the display engine generates monochromatic virtual images and the spectral-sensitive optical filter is configured to block forward-propagating light associated with the monochromatic virtual images.

A further example includes a head-mounted display (HMD) device wearable by a user and supporting a mixed-reality experience comprising a display of virtual images for objects in a virtual world and real-world images for objects in a real world, comprising: a display engine for selectively generating light for the virtual images, the virtual images being selectively generated from a full color palette or a reduced color palette having fewer colors relative to the full color palette; a waveguide combiner comprising a see-through waveguide having an eye-facing side and a real-world-facing side, an input coupler disposed on the waveguide configured for in-coupling the virtual image light from the display engine into the waveguide, and an output coupler disposed on the waveguide for out-coupling the virtual images from the waveguide to an eye of the user, wherein the waveguide combiner includes a see-through portion, located on the HMD device in front of the eye of the user when the HMD device is donned, through which the user views the real world; a dynamically variable spectral-selective optical filter disposed along a forward-propagating light path extending from the output coupler of the waveguide combiner towards the real world; and a controller operatively coupled to the display engine and the dynamically variable spectral-selective optical filter, the controller operating to match the selective generation of the virtual images by the display engine with operations of the dynamically variable spectral-selective optical filter to block forward-propagating virtual image light that leaks from the waveguide combiner towards the real world.

In another example, the controller is operated in response to activation of a manual control by the user. In another example, the HMD device further comprises a sensor package and the controller is operated in response to signals from the sensor package. In another example, the HMD device further comprises one or more applications that are operable on the HMD device and the controller is operated in response to signals generated by the one or more applications. In another example, the HMD device further comprises a user interface (UI) and the controller is operated in response to settings captured from the user at the UI. In another example, context for HMD device usage is determined using a combination of one or more of application activity, application usage history, user input, or sensor data, and the controller is operated in response to the determined context. In another example, the display engine and the dynamically variable spectral-selective optical filter are selectively switched between monochromatic and polychromatic operation. In another example, the selective switching is performed in response to one of manual control by the user or automatic operation based on context that is determined by the controller.

A further example includes a method for reducing light leakage in an optical display system configured to display virtual images in a mixed-reality usage scenario in which virtual images are seen by a user as superimposed over a physical real-world environment, comprising: providing a see-through waveguide combiner comprising at least one transparent waveguide having a first surface towards which a user of the waveguide combiner looks to view the real-world environment, and a second surface opposite the first surface, in which an input coupler and an output coupler are disposed on the waveguide; operating a display engine having alternative operating modes comprising selecting full-color virtual images or selecting reduced-color virtual images that are rendered in fewer colors relative to the full-color virtual images; configuring the waveguide combiner with a dynamically variable spectral-selective optical filter adjacent to the second surface of the waveguide, the dynamically variable spectral-selective optical filter being automatically configured to match the operating mode of the display engine to absorb forward-propagating virtual image light that is leaking from the waveguide combiner towards the real-world environment; and providing a user interface to the optical display system that supports a user-operable control for controlling operations of the display engine to switch between the alternative operating modes.

In another example, the user-operable control comprises a manual control for switching the display engine between the alternative operating modes. In another example, the manual control is physically embodied or is implemented as a virtual control that is operable by one or more of voice, gaze, gesture using a body part of the user, motion of the user, or input to a virtual keyboard or virtual input device. In another example, the user-operable control provides the user with options to set preferences, context, or conditions under which the display engine switches between the alternative operating modes in an automated manner. In another example, the optical display system is incorporated in a head-mounted display (HMD) device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A head-mounted display (HMD) device wearable by a user and supporting a mixed-reality experience comprising a display of virtual images for objects in a virtual world and real-world images for objects in a real world, comprising:

a display engine for selectively generating light for the virtual images, the virtual images being selectively generated from a full color palette or a reduced color palette having fewer colors relative to the full color palette;

a waveguide combiner comprising a see-through waveguide having an eye-facing side and a real-world-facing side, an input coupler disposed on the waveguide configured for in-coupling the virtual image light from the display engine into the waveguide, and an output coupler disposed on the waveguide for out-coupling the virtual images from the waveguide to an eye of the user, wherein the waveguide combiner includes a see-through portion, located on the HMD device in front of the eye of the user when the HMD device is donned, through which the user views the real world;

a dynamically variable spectral-selective optical filter disposed along a forward-propagating light path extending from the output coupler of the waveguide combiner towards the real world; and a controller operatively coupled to the display engine and the dynamically variable spectral-selective optical filter, the controller operating to match the selective generation of the virtual images by the display engine with operations of the dynamically variable spectral-selective optical filter to block forward-propagating virtual image light that leaks from the waveguide combiner towards the real world.

2. The HMD device of claim 1 in which the controller is operated in response to activation of a manual control by the user.

3. The HMD device of claim 1 further comprising a sensor package and in which the controller is operated in response to signals from the sensor package.

4. The HMD device of claim 1 further comprising one or more applications that are operable on the HMD device and in which the controller is operated in response to signals generated by the one or more applications.

5. The HMD device of claim 1 further comprising a user interface (UI) and in which the controller is operated in response to settings captured from the user at the UI.

6. The HMD device of claim 1 in which context for HMD device usage is determined using a combination of one or more of application activity, application usage history, user input, or sensor data, and the controller is operated in response to the determined context.

7. The HMD device of claim 1 in which the display engine and the dynamically variable spectral-selective optical filter are selectively switched between monochromatic and polychromatic operation.

8. The HMD device of claim 7 in which the selective switching is performed in response to one of manual control by the user or automatic operation based on context that is determined by the controller.

9. A method for reducing light leakage in an optical display system configured to display virtual images in a mixed-reality usage scenario in which virtual images are seen by a user as superimposed over a physical real-world environment, comprising:

providing a see-through waveguide combiner comprising at least one transparent waveguide having a first surface towards which a user of the waveguide combiner looks to view the real-world environment, and a second surface opposite the first surface, in which an input coupler and an output coupler are disposed on the waveguide;

operating a display engine having alternative operating modes comprising selecting full-color virtual images or selecting reduced-color virtual images that are rendered in fewer colors relative to the full-color virtual images;

configuring the waveguide combiner with a dynamically variable spectral-selective optical filter adjacent to the second surface of the waveguide, the dynamically variable spectral-selective optical filter being automatically configured to match the operating mode of the display engine to absorb forward-propagating virtual image light that is leaking from the waveguide combiner towards the real-world environment; and providing a user interface to the optical display system that supports a user-operable control for controlling operations of the display engine to switch between the alternative operating modes.

10. The method of claim 9 in which the user-operable control comprises a manual control for switching the display engine between the alternative operating modes.

11. The method of claim 10 in which the manual control is physically embodied or is implemented as a virtual control that is operable by one or more of voice, gaze, gesture using a body part of the user, motion of the user, or input to a virtual keyboard or virtual input device.

12. The method of claim 9 in which the user-operable control provides the user with options to set preferences, context, or conditions under which the display engine switches between the alternative operating modes in an automated manner.

13. The method of claim 9 in which the optical display system is incorporated in a head-mounted display (HMD) device.

\* \* \* \* \*